US011869312B2

(12) United States Patent
Uberuaga et al.

(10) Patent No.: US 11,869,312 B2
(45) Date of Patent: Jan. 9, 2024

(54) CONTINUOUS SYMBOL SEQUENCE MECHANICS FOR RANDOM BASED GAME OUTCOMES

(71) Applicant: Aristocrat Technologies, Inc., Las Vegas, NV (US)

(72) Inventors: Christmas Uberuaga, Reno, NV (US); Daniel Mirjavadi, Las Vegas, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 41 days.

(21) Appl. No.: 17/459,444

(22) Filed: Aug. 27, 2021

(65) Prior Publication Data

US 2022/0084366 A1 Mar. 17, 2022

Related U.S. Application Data

(60) Provisional application No. 63/077,502, filed on Sep. 11, 2020.

(51) Int. Cl.

*G07F 17/00* (2006.01)
*G07F 17/32* (2006.01)
*G07F 17/34* (2006.01)

(52) U.S. Cl.

CPC ...... *G07F 17/3267* (2013.01); *G07F 17/3213* (2013.01); *G07F 17/34* (2013.01)

(58) Field of Classification Search

CPC ... G07F 17/3267; G07F 17/3213; G07F 17/34
See application file for complete search history.

(56) References Cited

U.S. PATENT DOCUMENTS 6,106,393 A * 8/2000 Sunaga ............... G07F 17/3227 463/16
6,612,927 B1 9/2003 Slomiany
6,733,385 B1 5/2004 Enzminger
8,591,330 B2 11/2013 Kelly
9,177,447 B2 11/2015 Zoltewicz
9,959,703 B2 5/2018 Igesund
(Continued)

OTHER PUBLICATIONS

Office Action (Notice of Allowance and Fees Due (PTOL-85)) dated Nov. 17, 2021 for U.S. Appl. No. 16/836,403 (pp. 1-8).
(Continued)

*Primary Examiner* — James S. McClellan
*Assistant Examiner* — Jeffrey K Wong
(74) *Attorney, Agent, or Firm* — Blank Rome LLP

(57) ABSTRACT

A continuous symbol sequence supplemental game features is described. A gaming device randomly triggers, based on a random number generator, a continuous symbol sequence supplemental game feature. The gaming device randomly determines, based on the random number generator and triggering the continuous symbol sequence supplemental game feature, a number of credit symbols to add to a continuous symbol sequence. The gaming device randomly determine, based on the random number generator, the credit values for the credit symbols. The gaming device presents the continuous symbol sequence, wherein the credit values of the credit symbols in the continuous symbol sequence are arranged in a designated order.

20 Claims, 19 Drawing Sheets

(56) References Cited

U.S. PATENT DOCUMENTS

| | | | | |
|---|---|---|---|---|
| 10,115,272 | B2 | 10/2018 | Marks | |
| 10,176,668 | B2 | 1/2019 | Galasso | |
| 10,373,441 | B1 | 8/2019 | Halvorson | |
| 2003/0032479 | A1 | 2/2003 | LeMay | |
| 2004/0048646 | A1 | 3/2004 | Visocnik | |
| 2004/0082384 | A1 * | 4/2004 | Walker | G07F 17/3239 463/40 |
| 2004/0266516 | A1 | 12/2004 | Thomas | |
| 2006/0148562 | A1 * | 7/2006 | Walker | G07F 17/32 463/30 |
| 2006/0287036 | A1 | 12/2006 | Daly | |
| 2007/0238512 | A1 * | 10/2007 | Sato | G07F 17/3244 463/20 |
| 2008/0207312 | A1 | 8/2008 | Seelig | |
| 2009/0286588 | A1 | 11/2009 | Jackson | |
| 2011/0059791 | A1 | 3/2011 | Tarantino | |
| 2012/0270638 | A1 | 10/2012 | Eubanks | |
| 2014/0148241 | A1 | 5/2014 | Vallejo | |
| 2015/0379828 | A1 | 12/2015 | Lee | |
| 2015/0379829 | A1 | 12/2015 | Lee | |
| 2015/0379830 | A1 | 12/2015 | Lee | |
| 2015/0379831 | A1 | 12/2015 | Lee | |
| 2016/0140809 | A1 * | 5/2016 | Berman | G07F 17/3211 463/20 |
| 2017/0092071 | A1 | 3/2017 | Cuddy | |
| 2019/0378376 | A1 | 12/2019 | Bolling, Jr. | |
| 2020/0265681 | A1 | 8/2020 | Eubanks | |
| 2020/0265682 | A1 | 8/2020 | Eubanks | |
| 2021/0027583 | A1 | 1/2021 | Cuddy | |
| 2021/0082241 | A1 | 3/2021 | Marsh | |

OTHER PUBLICATIONS

Office Action (Notice of Allowance and Fees Due (PTOL-85)) dated May 12, 2022 for U.S. Appl. No. 16/836,588 (pp. 1-7).

Office Action dated Jun. 1, 2021 for U.S. Appl. No. 16/836,403 (pp. 1-13).

Office Action dated Sep. 2, 2021 for U.S. Appl. No. 16/836,588 (pp. 1-9).

Office Action (Notice of Allowance and Fees Due (Ptol-85)) dated Sep. 16, 2022 for U.S. Appl. No. 16/836,538 (pp. 1-8).

Office Action (Notice of Allowance and Fees Due (PTOL-85)) dated Nov. 23, 2022 for U.S. Appl. No. 16/836,538 (pp. 1-3).

* cited by examiner

900

902 904 908 906

| NUMBER | VALUE | PROBABILITY |
|---|---|---|
| 1-10 | a1 | x% |
| 11 | a1+m | y% |
| 12 | a1+n | • |
| 13 | a1+o | • |
| 14 | a1+p | • |
| • | • | • |
| • | • | • |
| 30 | a2 | • |
| 31 | a2+r | • |
| 32 | a2+s | • |
| 33 | a2+t | • |
| • | • | • |
| • | • | • |
| 60 | a4 | • |
| 61 | a4+u | • |
| 62 | a4+v | • |
| • | • | • |
| 99 | a6+y | • |
| 100 | a6+z | • |

910 912 914 916

FIG. 9A

| COUNT VALUE | VALUE | PROBABILITY |
|---|---|---|
| 1-10 | a1 | x% |
| 11 | a1+m | y% |
| 12 | a1+n | ⋮ |
| 13 | a1+o | ⋮ |
| 14 | a1+p | ⋮ |
| ⋮ | ⋮ | ⋮ |
| ⋮ | ⋮ | ⋮ |
| 30 | a2 | ⋮ |
| 31 | a2+r | ⋮ |
| 32 | a2+s | ⋮ |
| 33 | a2+t | ⋮ |
| ⋮ | ⋮ | ⋮ |
| ⋮ | ⋮ | ⋮ |
| 60 | a4 | ⋮ |
| 61 | a4+u | ⋮ |
| 62 | a4+v | ⋮ |
| ⋮ | ⋮ | ⋮ |
| 99 | a6+y | ⋮ |
| 100 | a6+z | ⋮ |

*FIG. 9B*

| COUNT VALUE | VALUE | PROBABILITY |
|---|---|---|
| 1-10 | a1 | x% |
| 11 | a1+m | y% |
| 12 | a1+n | • |
| 13 | a1+o | • |
| 14 | a1+p | • |
| • | • | • |
| • | • | • |
| 30 | a2 | • |
| 31 | a2+r | • |
| 32 | a2+s | • |
| 33 | a2+t | • |
| • | • | • |
| • | • | • |
| 60 | a4 | • |
| 61 | a4+u | • |
| 62 | a4+v | • |
| • | • | • |
| 99 | a6+y | • |
| 100 | a6+z | • |

*FIG. 9C*

1000

1002 1004 1008 1006

| COUNT VALUE | VALUE | PROBABILITY |
|---|---|---|
| 1-10 | a1 | x% |
| 11 | a1+m | y% |
| 12 | a1+n | • |
| 13 | a1+o | • |
| 14 | a1+p | • |
| • | • | • |
| • | • | • |
| 30 | a2 | • |
| 31 | a2+r | • |
| 32 | a2+s | • |
| 33 | a2+t | • |
| • | • | • |
| • | • | • |
| 60 | a4 | • |
| 61 | a4+u | • |
| 62 | a4+v | • |
| • | • | • |
| 99 | a6+y | • |
| 100 | a6+z | • |

1002

1010 TIER 1

1012 TIER 2

1014 TIER 3

FIG. 10A

CONTINUOUS SYMBOL SEQUENCE MECHANICS FOR RANDOM BASED GAME OUTCOMES

CROSS-REFERENCE TO RELATED APPLICATION

This application claims the benefit of priority to U.S. Provisional Patent Application Ser. No. 63/077,502, filed Sep. 11, 2020.

BACKGROUND

The disclosure relates generally to the field of user interface (UI) design, electronic gaming devices, and electronic gaming software. More particularly, but not by way of limitation, this disclosure relates to performing gaming device operations that present and implement one or more continuous symbol sequence mechanics for random based game outcomes.

Electronic gaming machines (EGMs) or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of a game instance (or single play) of a primary or base game. In some cases, a player may qualify for a special mode of the base game, a secondary game feature, or a bonus game feature of the base game by attaining a certain winning combination or triggering event in, or related to, the base game, or after the player is randomly awarded the special mode, secondary game feature, or bonus game feature. In the special mode, secondary game feature, or bonus game feature, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency, or number of secondary game features, and/or the amount awarded.

Typical games use a random number generator (RNG) to randomly determine the outcomes (also referenced throughout the disclosure as a "random based game outcome") for the games. Examples of random based game outcomes include slots, video poker, video blackjack, video pachinko, keno, bingo, and lottery outcomes. The games are also designed to return a certain percentage of the amount wagered back to the player over the course of many rounds of play or game instances, which is generally referred to as return to player (RTP) for a game. The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

EGMs often depend on usability (e.g., ease of use and player understandability) and new or improved game features to enhance player experiences on the EGMs. Although previous EGMs include various UI features, game features, and backend game processing operations associated with the UI features to improve usability and enhance player experiences, there is a continuous need for further improvement to EGMs and other electronic gaming devices, electronic gaming software, and/or UI design.

SUMMARY

In one implementation, a system comprises memory and a processor operable to interact with the memory. The processor randomly triggers based on a random number generator, a continuous symbol sequence supplemental game feature and randomly determines, based on the random number generator and triggering the continuous symbol sequence supplemental game feature, a number of credit symbols to add to a continuous symbol sequence. The processor may then randomly determine, based on the random number generator, the credit values for the credit symbols and present the continuous symbol sequence, wherein the credit values of the credit symbols in the continuous symbol sequence is arranged in a designated order.

In one or more implementations, each of the above described methods, and variations thereof, may be implemented as a series of computer executable instructions executed on a programmable electronic device. Such instructions may use any one or more convenient programming language. Such instructions may be collected into engines and/or programs and stored in any computer-readable medium or media that is readable and executable by a computer system, gaming device, or other programmable electronic device.

A first example implementation is a gaming system, including: a user interface system configured for receiving an indication to initiate one or more instances of a slot game; a display system comprising one or more displays; and a control system. In this first example implementation, the control system includes one or more processors; and a memory storing one or more dynamic data structures, which include at least a first data structure including at least a first lookup table having entries establishing probabilities and values of possible awards correlated with respective numerical values. The control system executes instructions which cause the control system to perform operations including: presenting a game instance; determining an instance outcome including display symbols selected from a symbol set; in response to determining the instance outcome, controlling the display system to display the display symbols associated with the instance outcome; after determining the instance outcome, automatically determining whether a multi-stage incrementing feature will be awarded. In response to determining that a multi-stage incrementing feature will be awarded, additional operations will be performed, including automatically determining award values for multiple respective stages of the multi-stage incrementing feature, comprising, correlating a respective random number generator (RNG) call with numerical values of the first data structure to determine a stage award value associated with the correlated numerical value; and in response to determining the stage award value, modifying the first data structure to limit selection of entries for a following stage to entries associated with award values at least equal to the determined first stage award value; and controlling the display system to sequentially display the multiple determined stage award values.

A second example implementation is a gaming system, including system configured for receiving an indication to initiate one or more instances of an electronic game; and a control system comprising, one or more processors, and a memory storing one or more dynamic data structures, wherein the one or more dynamic data structures includes a first data structure including at least a first lookup table having entries establishing probabilities and values of possible awards correlated with respective numerical values. The control system executes instructions which performing of operations comprising: determining a game instance outcome; after determining the instance outcome, automatically determining whether a continuous symbol sequence feature will be awarded; in response to determining that a continuous symbol sequence feature will be awarded, automatically determining award values for the continuous symbol sequence feature, comprising, correlating a respective random number generator (RNG) call with a value of the first data structure to determine a first stage award value associated with the correlated value; and in response to determining the first stage award value, modifying the first data structure to limit selection of entries for a following stage to entries associated with award values at least equal to the determined first stage award value.

A further example implementation includes one or more machine-readable devices storing instructions and data structures, wherein at least one of the data structures is a dynamic data structure, and wherein the instructions, when executed by one or more processors, cause performance of operations, comprising: in response to receiving a signal, initiating at least one instance of an electronic game, and determining an instance outcome. After determining the instance outcome, additional operations are performed, including automatically determining whether a continuous symbol sequence feature will be awarded; in response to determining that a continuous symbol sequence feature will be awarded, automatically determining award values for the continuous symbol sequence feature, comprising, correlating a respective random number generator (RNG) call with a value of the dynamic data structure to determine a first stage award value for the continuous symbol sequence feature; in response to determining the first stage award value for the continuous symbol sequence feature, modifying the dynamic data structure to limit selection of entries of the dynamic data structure for determining a subsequent stage award value; and correlating a subsequent RNG call with a value of the modified dynamic data structure to determine a subsequent stage award value.

Additional example implementations, and variations upon the above-identified implementations are identified within the specification.

BRIEF DESCRIPTION OF THE DRAWINGS

While certain implementations will be described in connection with the illustrative implementations shown herein, this disclosure is not limited to those implementations. On the contrary, all alternatives, modifications, and equivalents are included within the spirting and scope of the invention as defined by the claims. In the drawings, which are not to scale, the same reference numerals are used throughout the description and in the drawing figures for components and elements having the same structure. If applicable, primed reference numerals are used for components and elements having similar function and construction to those components and elements having the same unprimed reference numerals.

FIGS. 9A-C graphically depict a functional representation of a dynamic lookup table for implementing continuous symbol sequence mechanics, depicted at individual illustrative stages.

FIGS. 10A-D graphically depict a functional representation of an alternative dynamic lookup table for implementing continuous symbol sequence mechanics, depicted at individual illustrative stages.

DETAILED DESCRIPTION

Figure 1:
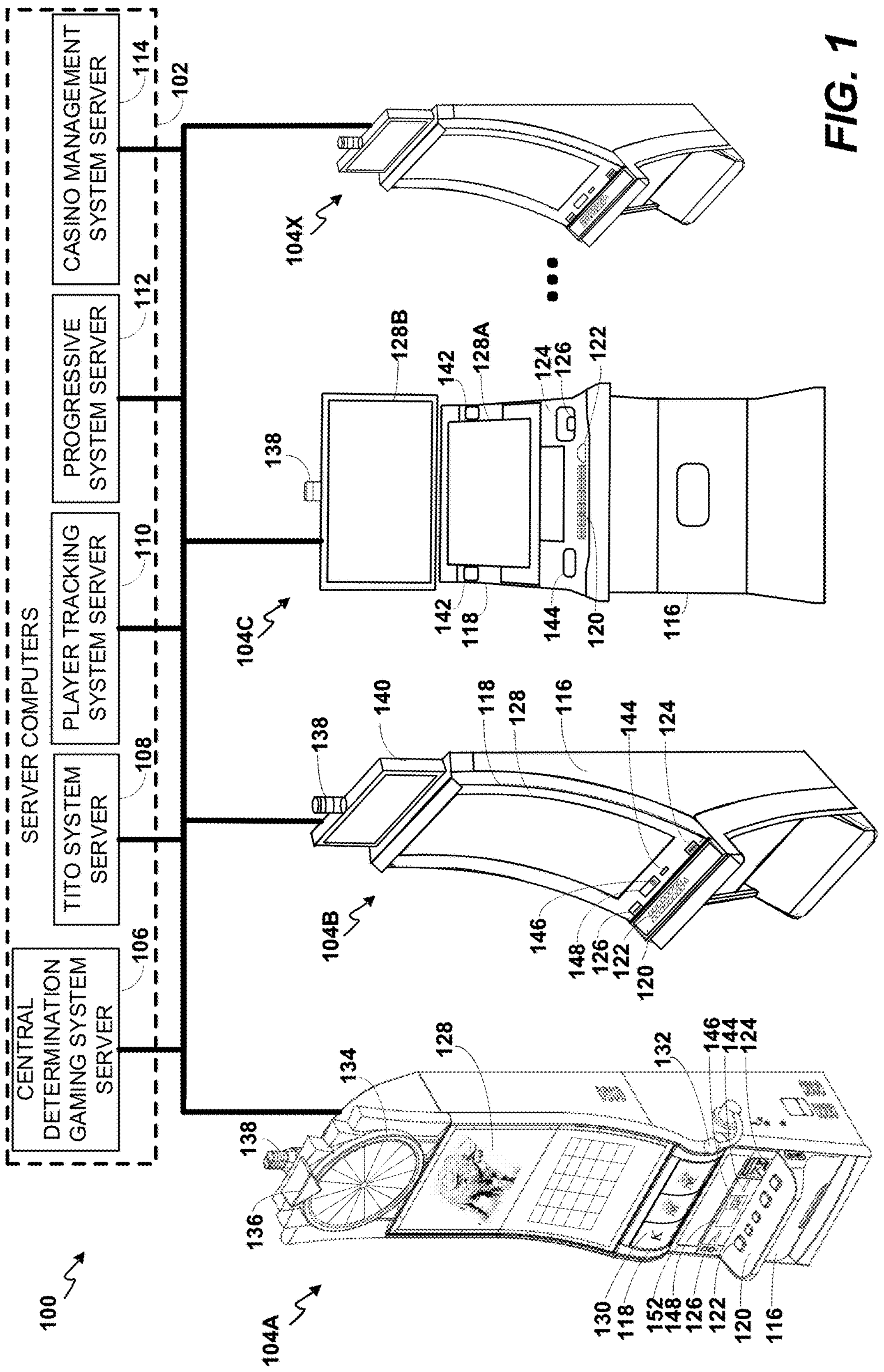
FIG. 1 is an exemplary diagram showing several EGMs networked with various gaming related servers.

The disclosure includes various example implementations that generate random based game outcomes according to one or more continuous symbol sequence mechanics. In one or more implementations, a gaming device randomly determines whether to trigger a continuous symbol sequence supplemental feature (e.g., a special mode, secondary game feature, or bonus game feature) while in a base game and/or supplemental game feature (e.g., a free games bonus feature). After entering the continuous symbol sequence supplemental feature, the gaming device generates and pays out a continuous sequence of credit symbols with credit values. The gaming device presents the continuous sequence of credit symbols using an animation that depicts a series of credit symbols popping off an animated object (e.g., a flying dragon) and adding their corresponding credit values to a payout meter. The animation displays the continuous sequence of credit symbols in a designated order, such as from lowest credit value to highest credit value or vice versa, to enhance a player's understandability of the game.

The continuous symbol sequence mechanics can be implemented through various hardware and associated data structures. In some implementations a continuous symbol sequence may be determined by determining symbol values in randomly variable amounts and over a randomly variable number of stages, in which symbol values are randomly selected for respective stages until a final stage and a final total supplemental feature value are reached. Some desirable game designs will be configured to present the prizes in increments in order of increasing value. The term "continuous symbol sequence" refers to continuity of the presentation of multiple symbol values, and not to any individual symbols being continuously displayed (though the term is not intended to preclude continuous display of one or more symbols).

For concision, the term "multi-stage incrementing supplemental feature" is used herein to describe a manner of implementing a continuous symbol sequence, in which one or more symbol values are sequentially determined at respective stages. As described in more detail in reference to FIGS. 9-12, the values at individual stages may be determined through a dynamic data structure that reconfigures as individual stage values are determined. Some desirable game mechanics will be configured to present the multiple prizes (such as accumulating credit values) in order of increasing value.

The terms "feature" and "supplemental feature" are used herein to describe the continuous symbol sequence operation and mechanics. Such terminology is not limiting on how the feature may be presented in the context of an electronic game, and may be presented, for example, as part of a special mode, a base game, or a bonus game feature (each as discussed above), or in any other desired context of the game. Some desirable game designs will be configured to present the prizes in increments in order of increasing value.

The required determinations for determining how many incremental stages exist, and a prize value to be awarded at each stage can present a relatively large number of variables, particularly when considering presenting the desirability of presenting symbol values in order of increasing value. At the same time, any such implementation should be made in a manner to provide relative computational efficiency for the gaming machine/gaming network, while at the same time maintaining a regulatory required RTP.

A first alternative solution to this need for computational efficiency notwithstanding the identified variables, while simultaneously controlling the RTP, can be found in controlling game operations through use of one or more data structures including one or more dynamic lookup tables for use in presenting an incrementing supplemental feature, which table(s) is/are incrementally reconfigured in response to a determination made in response to a preceding lookup table configuration. Where multiple lookup tables are used, the tables may beneficially be linked, through a logical link between the tables, such that a determination of a stage value is linked to selection and/or configuration of a table for determining a second value, until a final symbol value determination is made through an associated lookup table. In addition to the number of lookup tables, the nature of the dynamic configuration can be selected to improve system functionality; as such use of dynamic tables can provide greater computational efficiency while at the same time maintaining a regulatory required RTP.

In an alternative implementation, rather than determining multiple symbol values through use of one or more dynamic lookup tables, an alternative can be to randomly determine a total value to be awarded for the incrementing supplemental feature; and to then determine a number of symbol values to be displayed. A problem can exist in providing a continuous symbol sequence with a wide range of potential symbol values, as some jurisdictions impose a maximum value on an award from a gaming machine/system. As a result, constraining a maximum award can complicate the design and configuration of the dynamic (logically linked) lookup tables.

A solution to this additional problem is to utilize a data structure, which may be implemented, for example, as a single lookup table, to determine a total symbol value to be awarded for the continuous symbol sequence feature. From that total value, selections can be made of a number of symbols to be displayed, and the value of each symbol, within the randomly determined total symbol value; which may then be communicated an appropriate system for display to a user.

In one or more implementations as will be described herein, the gaming device directly determines the number of credit symbols in the continuous sequence of credit symbols. As an example, the gaming device can directly determine the number of credit symbols based on the number of target symbols that land in the base game and/or supplemental game feature. In another example, the gaming device can randomly determine the number of credit symbols according to a randomly generated value representative of the total number of credit symbols. Afterwards, the gaming device randomly determines the credit values for each of the credit symbols. To determine the credit values, the gaming device randomly determines the credit values from one or more lookup tables. Where multiple lookup tables are utilized, one or more of the lookup tables may have varying credit value ranges relative to another of the lookup tables. In some examples, to present a continuous sequence of credit symbols in a designated order, the gaming device sorts the credit values. Additionally, or alternatively, the gaming device can randomly determine the credit value by logically linking a prior determined credit value to a designated lookup table that determines the next credit value. In such alternative implementations, the lookup tables may dynamically configure to determine the credit values in a desired sequential order. By doing so, the gaming device can not only control or define the degree of randomness for the credit values in the continuous sequence of credit symbols, but also avoid sorting the credit values.

In one or more implementations, the gaming device can indirectly determine the number of credit symbols presented in the continuous symbol sequence supplemental feature. To indirectly determine the number of credit symbols, the gaming device randomly determines the number of credit symbols for a designated set of credit values. In one implementation, the gaming device randomly determines the number credit symbols for each designated credit value. For example, the gaming device could have the following credit values: 88 credits, 188 credits, 288 credits, and 388 credits. The gaming device can randomly determine to assign two credit symbols with the 88 credit value, one credit symbol with the 188 credit value, three credit symbols with the 288 credit value, and zero credit symbols with the 388 credit value. By adding up the credit symbols for each designated credit value (e.g., six total credit symbols), the gaming device indirectly determines the number of credit symbols for the feature.

Additionally, or alternatively, the gaming device can randomly determine the number of credit symbols for multiple credit values by using multiple lookup tables. Each lookup table is configured to generate a designated range of the number of credit symbols (e.g., 5-10 credit symbols, or a much greater number) and associated credit values for the determined number of credit symbols. One or more lookup tables could have differing ranges of the number of credit symbols and associated credit values. Continuing with the example above, the gaming device could have a dataset for determining the continuous symbol sequence which includes a first lookup table A that randomly determines to include five to ten credit symbols in the continuous symbol sequence, and a second lookup table B that randomly determines to include zero to five credit symbols. The credit symbols for lookup table A could either have an 88 credit value or a 188 credit value while credit symbols for lookup table B could either have a 288 credit value or a 388 credit value.

In terms of technical effects, the continuous symbol sequence supplemental feature mechanics, including the described datasets, described throughout the disclosure delivers improvements to electronic gaming software, UI design, and/or gaming devices by providing new and/or improved gaming device operations that comply with gaming regulations.

Specifically, in described embodiments the use of continuous symbol sequence supplemental feature mechanics presents a designated order of credit values rather than a randomized order. A designated order of credit values can improve the usability of the gaming devices and enhance a player's understandability of obtaining certain random based game outcomes while complying with gaming regulations. In one or more implementations, a gaming device can avoid performing a sort operation by controlling the degree of randomness of the credit values. As an example, the gaming device can utilize a linking operation that logically links a prior determined credit value to a designated lookup table that determines the next credit value. In another example, the gaming device could randomly determine the number of credit symbols for a designated set of credit values. As a result, with respect to executing new and/or improved gaming device operations, the gaming device can also be specially programmed to be computationally efficient by avoiding the use of a sort operation when executing the continuous symbol sequence supplemental feature.

Example Electronic Gaming Devices and Gaming Environments

FIG. 1 illustrates several different models of EGMs that could be specially configured to generate random based game outcomes using one or more symbol frame mechanic. As shown in FIG. 1, the EGMs, which are more generally referred to as gaming devices 104A-104X, may be networked to various gaming related servers. Shown is a system 100 in a gaming environment including one or more server computers 102 (e.g., slot servers of a casino) that are in communication, via a communications network, with one or more gaming devices 104A-104X (e.g., EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless TITO system). In such cashless implementations, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game feature. Bonus topper wheel 134 is typically used to play a bonus game feature, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.01 or $0.05), paylines, pay tables, and/or various game related graphics. In some implementations, the information panel(s) 152 may be implemented as an additional video display.

Figure 2A:
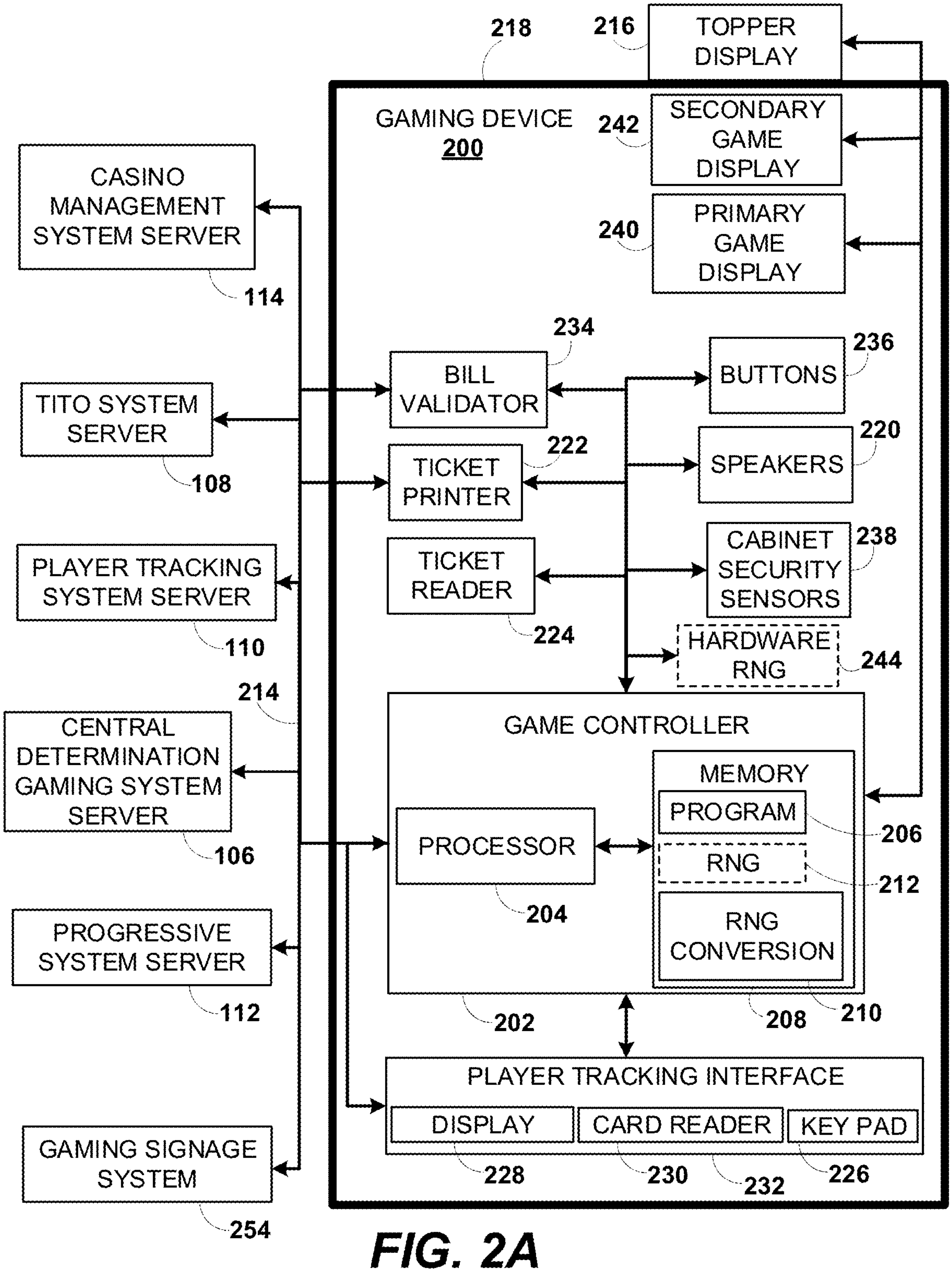
FIG. 2A is a block diagram showing various functional elements of an exemplary EGM.

Gaming devices 104A have traditionally also included a handle 132 typically mounted to the side of main cabinet 116 which may be used to initiate game play. Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game feature display for bonus play, to show game features or attraction activities while a game is not in play, or any other information or media desired by the game designer or operator. In some implementations, the optional topper screen 140 may also or alternatively be used to display progressive jackpots available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify, and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus game features, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. Similar to FIG. 1, gaming device 200 can be specially configured to generate random based game outcomes using a repeat accrual meter mechanic. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, universal serial bus (USB) flash drives, memory cards (e.g., Compact Fast (CFast) memory card), floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via UI) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred throughout this disclosure as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features (e.g., bonus game feature, special mode, secondary game feature, and/or other supplemental game features). In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a predetermined level of RTP (e.g., RTP of at least 75%) for a game (also referenced throughout the disclosure as a "target game RTP"). A game can use one or more lookup tables (also referenced throughout this disclosure as "weighted tables") as part of a technical solution that satisfies regulatory requirements for randomness and RTP. In particular, a lookup table can integrate game features (e.g., trigger events for special modes or bonus game features; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target game RTP. In general, volatility refers to the frequency or probability of an event such as a special mode, payout, etc. For example, to achieve a specific target game RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables and/or reel strips to translate the RNG outcome to a symbol element, stop position for a reel strip, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table and/or reel strips to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment, and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive game credit awards based on the outcome of winning instances. The credit balance is decreased by the amount of each wager and increased upon a win. The player can add additional game credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus game feature or select various items during a feature game). The player may make these selections using the player-input buttons 236, the primary game display 240 which may be a touch screen or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2A. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
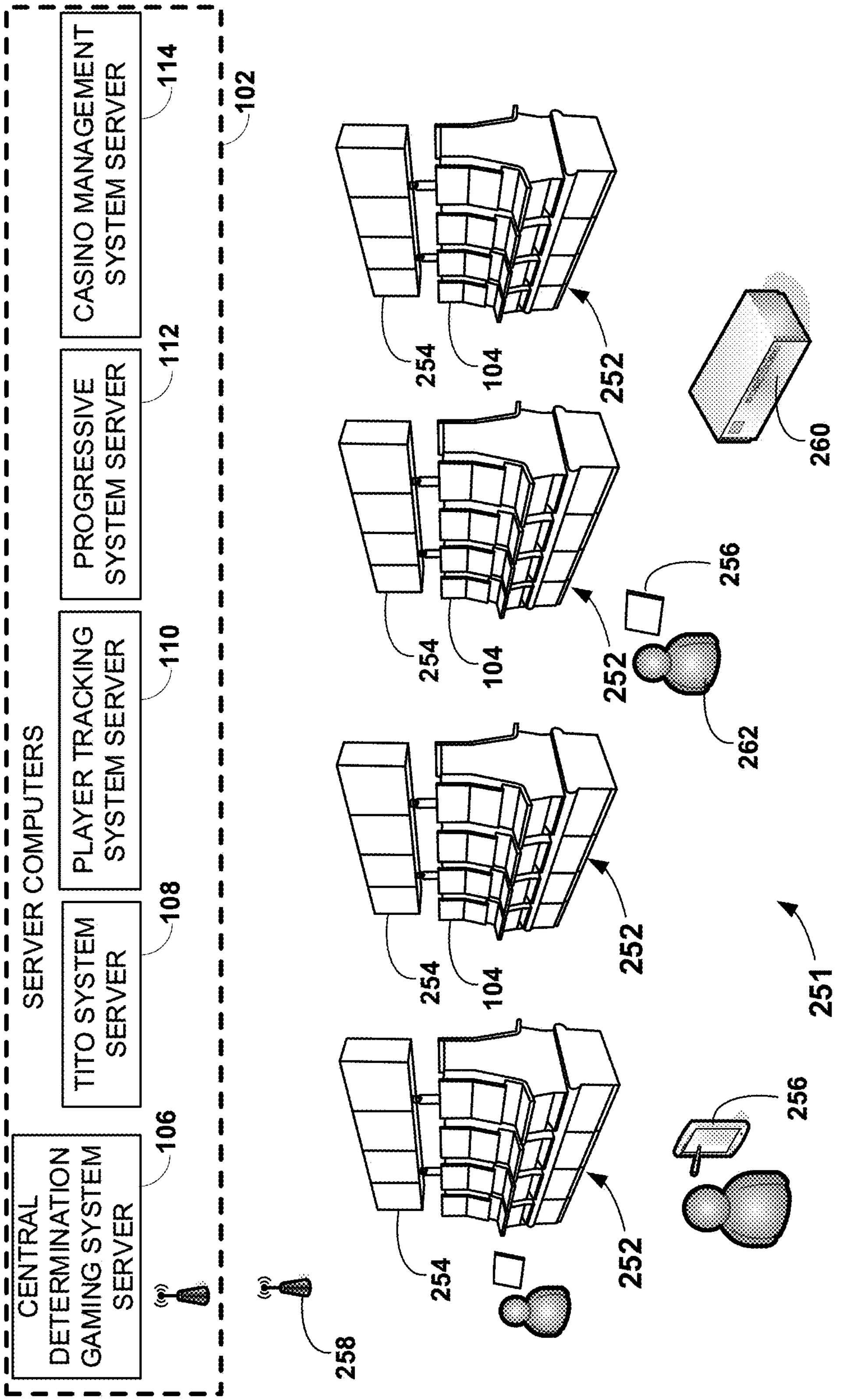
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones, dedicated gaming consoles, and/or other handheld or portable devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
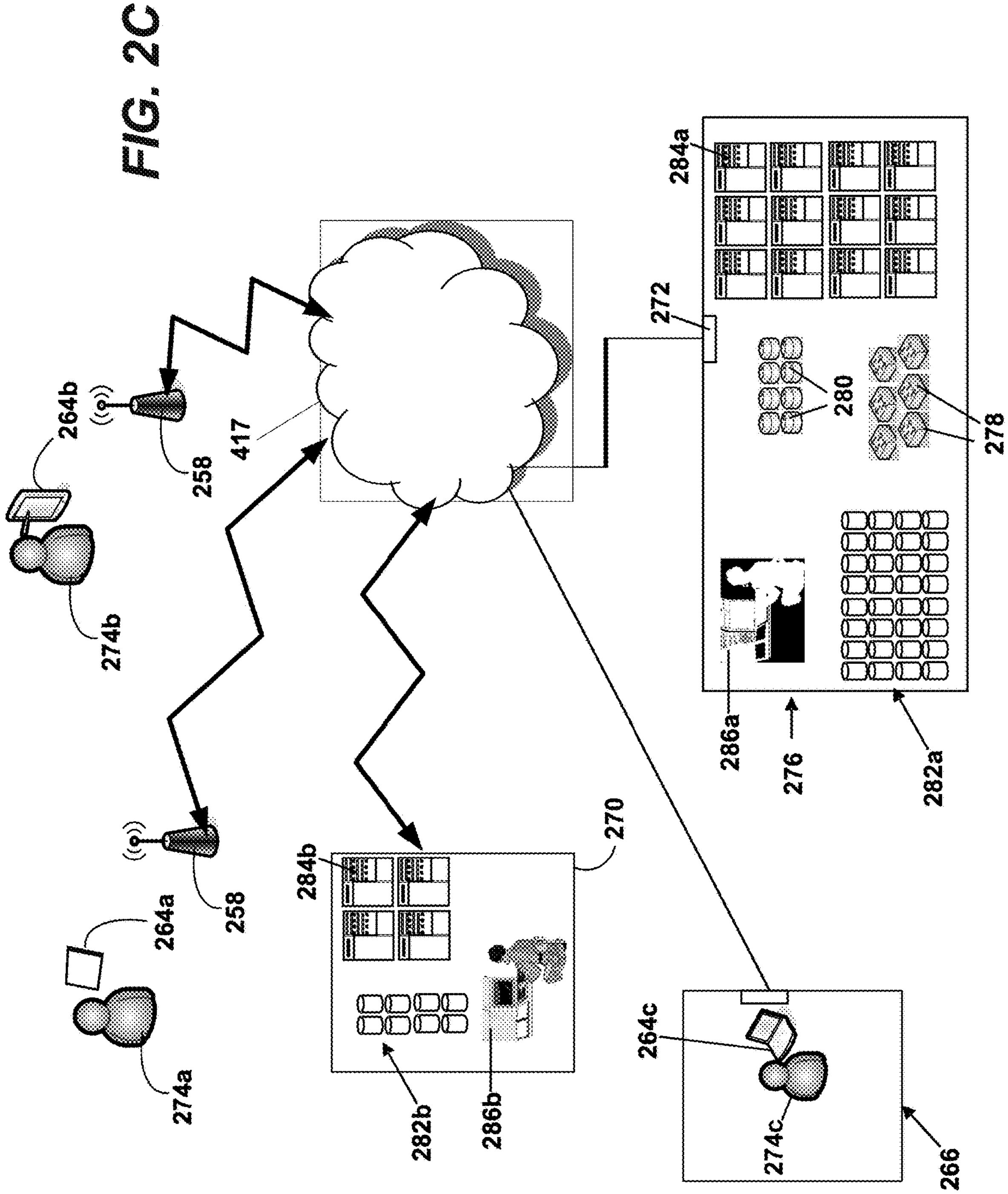
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types, and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which game credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Example Game Processing Architecture

Figure 3:
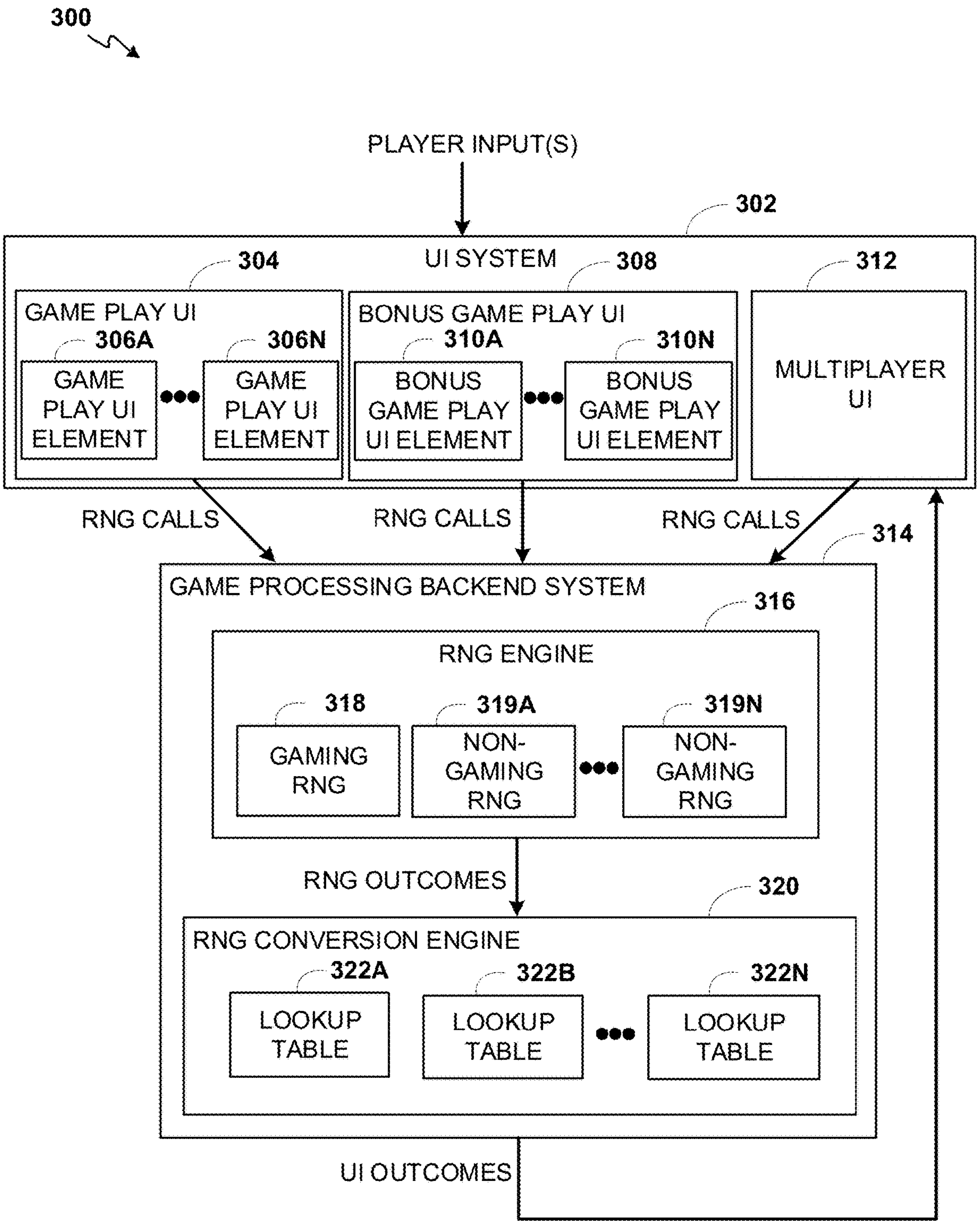
FIG. 3 illustrates, in block diagram form, an implementation of a game processing architecture that implements a game processing pipeline for the play of a game in accordance with various implementations described herein.

FIG. 3 illustrates, in block diagram form, an implementation of a game processing architecture that implements a game processing pipeline 300 for the play of a game in accordance with various implementations described herein. As shown in FIG. 3, the gaming processing pipeline 300 starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes, for example random numbers. The RNG outcomes are then sent to the RNG conversion engine 320 to generate one or more game outcomes for the UI system 302 to display to a player. A gaming device, such as gaming devices 104A-104X and 200 shown in FIGS. 1 and 2A, respectively, can implement the game processing pipeline 300. Alternatively, portions of the game processing pipeline 300 can be implemented using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels in a reel area) are shown and/or made available to a user. In a subsequent game instance, the UI system 302 could transition out of the base game to one or more bonus game features. The bonus game play UI 308 represents a UI that utilizes bonus game play UI elements 310A-310N for a player to interact with and/or view during a bonus game feature. In one or more implementations, at least some of the game play UI element 306A-306N are similar to the bonus game play UI elements 310A-310N. In other implementations, the game play UI element 306A-306N can differ from the bonus game play UI elements 310A-310N.

In one or more implementations, the game processing pipeline 300 can incorporate the example implementations described herein into various types of reel games. In particular, a reel game includes a base reel game shown with game play UI 304 or bonus reel game shown with bonus game play UI 308. Generally, a base, or primary, reel game includes play that involves spinning reels. A bonus reel game can add the possibility of winning a relatively large payout. A bonus reel game may require an additional wager, but typically does not. For purposes of this disclosure, a bonus reel game can be a type of supplemental game feature the game processing pipeline 300 can implement.

For a reel game, the game play UI 304 and/or bonus game play UI 308 includes a reel area that encloses viewable portions of a set of reels associated with the reel area. For each reel strip, the viewable portion of the reel strips includes one or more positions for symbols (also referenced throughout the disclosure as "symbol window positions"). Thus, the reel area is a matrix of symbols on a UI and may be highlighted to emphasize reel strips and symbols within the reel area. The number of reel strips and dimensions of the reel area depend on implementation. In some typical configurations, a reel area has an m×n configuration, with m reels and with n symbols visible per reel. For example, for a base reel game, a reel area can have a 5×3 configuration—five reels per window, with three symbols showing in the window for each of the reels. More generally, the reel area spans m reels in a first dimension and spans n symbols in a second dimension orthogonal to the first dimension, where the value of m can be 4, 5, 6, 7, 8, or some other number of reels, and the value of n can be 2, 3, 4, 5, 6, or some other number of symbols. Typically, the m reels are arranged horizontally in the reel area from left-to-right, with the m reels spinning vertically and the reel area showing n symbols of each of the respective reels. Alternatively, the m reels are arranged vertically in the reel area from top-to-bottom, with the m reels spinning horizontally and the reel area showing n symbols of each of the respective reels. Alternatively, a reel area can have another configuration. For example, a reel area can have different numbers of symbols visible for different reels (e.g., going left to right in a reel area, two symbols visible for a leftmost reel, three symbols visible for a second reel, four symbols visible for a center reel, three symbols visible for a fourth reel, and two symbols visible for a rightmost reel), or as further explained below, a reel area can have a p×q configuration, with p×q reels visible in a rectangular reel area, and a single symbol visible per reel.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. As an example, in a reel game, to determine the random base game outcome, the RNG conversion engine 320 includes reel strips that vary in symbol pattern and reel strip length. Each reel strip includes x positions along a one-dimensional strip of symbols, where x depends on implementation. For example, x is 30, 80, 100, 200, or some other number of positions. The value of x can be the same or different for different reels (thus, different reels can have different numbers of positions). Each reel can have a data structure (e.g., array, linked list) that tracks the symbols at the respective positions of the reel strip for the reel. In some example implementations, the configuration of the symbols at the positions of the reel strips for the reels of a reel game is fixed after the reel game boots, although limited reconfiguration operations may be permitted. In other example implementations, the configuration of the symbols at the positions of the reel strips for the reels of a reel game can change dynamically after the reel game boots (e.g., depending on bet level or some other factor). Different sets of reels can be used for a base reel game and bonus reel game (or other supplemental game feature such as a special mode of the base reel game). For example, for a special mode of a base reel game, more "valuable" symbols, such as wild symbols or scatter symbols, can be added to the reels of a base reel game or swapped in for other symbols on the reels.

RNG conversion engine 320 could also utilizes one or more lookup tables 322A-322N, which are also called weighted tables, to regulate a prize payout amount for each RNG outcome and how often the gaming device pays out the derived prize payout amounts. To do so, RNG conversion engine 320 can determine various game outcomes and perform operations for various types of base game features and/or supplemental game features (e.g., a bonus game feature). Although not shown in FIG. 3, the RNG conversion engine 320 could store and/or utilize one or more sets of reel strips, where each set of reel strips has different reel strip patterns. The RNG conversion engine 320 can also store (e.g., as data structures) and/or utilize one or more lookup tables 322 to assign probabilities to different options. For example, the RNG conversion engine 320 selects one of the different options based on a random number for the RNG outcome, where the different options are represented in different entries of a lookup table 322.

In one or more implementations, for a given lookup table 322, the probabilities for different options can be reflected in table entry values (e.g., for a random number RND associated with a RNG outcome, generated by an RNG, in the range of 0<RND<=40 for option 1, 40<RND<=70 for option 2, 70<RND<=90 for option 3, and 90<RND<=100 for option 4, given four options and a random number RND where 0<RND<=100). The table entry values can represent percentages or, more generally, sub-ranges within the range for a random number. In some implementations, the table entry values for a lookup table 322 are represented as count values (which can also be referend throughout the disclosure as "weights") for the respective entries of the lookup table. As an example, the following table shows count values for the four options described above:

TABLE 1

Example Lookup Table

| count value | entry |
|---|---|
| 40 | <value a1, value a2, ...> |
| 30 | <value b1, value b2, ...> |
| 20 | <value c1, value c2, ...> |
| 10 | <value d1, value d2, ...> |

The sum total of the count values indicates the range of the options. Game processing backend system 314 can use a random number for an RNG outcome, generated between 1 and the sum total of the count values, to select one of the entries in the lookup table 322 by comparing the random number to successive running totals. In the example shown in Table 1, if the random number for the RNG outcome is 40 or less, the RNG conversion engine 320 selects the first entry. Otherwise, if the random number for the RNG outcome is between 41 and 70, RNG conversion engine 320 selects the second entry. Otherwise, if the random number for the RNG outcome is between 71 and 90, the RNG conversion engine 320 selects the third entry. Otherwise, the RNG conversion engine 320 selects the last entry. The table entry values for a lookup table 322 can be fixed and predetermined, can vary dynamically (e.g., depending on bet level), or can be dynamically selected (e.g., depending on bet level, depending on another factor) from among multiple available lookup tables. Different game parameters or choices during game play can use different lookup tables 322, or different combinations of game parameters or choices can be combined in entries of a given lookup table 322.

In general, after the reel strips have landed to produce a random based game outcome (also referenced throughout the disclosure as "reel stops"), game processing backend system 314 identifies any win conditions and any win amounts to award to the player (e.g., credited to the player's credit balance). In some examples, win conditions depend on a count of credit symbols that land after the reel stops. In other examples, win conditions are defined as paylines (also called win lines) across at least a portion of a reel area on a display screen. For a round of play, game processing backend system 314 awards a win amount when a certain combination of symbols appears along a payline. Win amounts can vary according to the combination of symbols and according to the particular payline along which the combination of symbols land. In one or more implementations, instead of evaluating win conditions on paylines across reels, game processing backend system 314 can determine an award according to a "ways" approach. Game processing backend system 314 typically determines the win amounts according to a pay table, where the pay table comprehends the various combinations of symbols and/or paylines that may occur (e.g., the win conditions). The win amount for a round of play may be a fraction of an amount wagered for that round of play for certain win conditions. For other win conditions, the win amount may be much larger than the amount wagered.

After generating the UI outcome, game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game feature, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline 300.

Continuous Symbol Sequence Mechanics

With reference to FIG. 3, to implement one or more continuous symbol sequence mechanics, the UI system 302 starts off by presenting a base game to a player using game play UI 304. After a player sets a wagering amount and initiates a game instance (can also be referred to within this disclosure as a "round of play" or for a slot game context as a "spin"), game play UI 304 presents to a player a random based game outcome. For one or more game instances, the random based game outcome for the base game includes one or more target symbols that cause the game play UI 304 to randomly transition to bonus game play UI 308 that shows a continuous symbol sequence supplemental feature. The bonus game play UI 308 can present the continuous symbol sequence supplemental feature, using one or more animations, to depict a series of credit symbols popping off an animated object (e.g., a flying dragon) and adding their corresponding credit values to a payout meter. When presenting the continuous symbol sequence supplemental feature, the bonus game play UI 308 arranges the credit symbols in a designated sequence or pattern. For example, bonus game play UI 308 can present the sequence of credit symbols from lowest credit value to highest credit value, vice versa, or other sorting sequences.

To support presenting the continuous symbol sequence supplemental feature within UI system 302, game processing backend system 314 randomly determines whether to trigger the continuous symbol sequence supplemental feature within a base game and/or supplemental game feature. In one example, game processing backend system 314 triggers the continuous symbol sequence supplemental feature based on the random based game outcome in the base game and/or supplemental game feature. In another example, game processing backend system 314 performs an RNG pull from a lookup table 322 (e.g., lookup table 322A) to determine whether to trigger the continuous symbol sequence supplemental feature. For this example, the RNG pull is separate and independent from the RNG pulls that generate the random based game outcome in the base game and/or supplemental game feature. The lookup table 322 (e.g., lookup table 322A) maps the RNG outcome to a game evaluation that determines whether to trigger the continuous symbol sequence supplemental feature. In another example, game processing backend system 314 could use a hybrid approach of the two examples above by performing the RNG pull from the lookup table 322 when the random based game outcome lands one or more target symbols.

In one or more implementations, after determining to trigger the continuous symbol sequence supplemental feature, game processing backend system 314 directly determines the number of credit symbols present in the continuous sequence of credit symbols. For example, the game processing backend system 314 can directly determine the number of credit symbols based on the number of target symbols that land in the base game and/or supplemental game feature. In another example, the game processing backend system 314 randomly determines the number of credit symbols according to an RNG pull from a lookup table 322 (e.g., lookup table 322B). The RNG pull can return a table value representative of the number of credit symbols are shown in the continuous symbol sequence supplemental feature.

After directly determining the number of credit symbols for the continuous symbol sequence supplemental feature, the game processing backend system 314 randomly determines the credit values for each credit symbol. To determine the credit values, in some examples, the game processing backend system 314 can determine credit symbol values using one or more dynamic lookup tables that, in response to one or more determined credit values is reconfigured through use of appropriate processing circuitry in game processing backend system 314 (for example in RNG conversion engine 320) for use in determining a subsequent credit. In various examples, and as discussed in more detail in reference to FIG. 10, a dynamic lookup table may be configured to allocate potential credit values to different tiers of values.

In other examples, to determine the credit values the game processing backend system 314 randomly determines the credit values from multiple lookup tables 322 with varying credit value ranges, which in some examples may come from multiple sets of lookup tables defining different credit value ranges. In other words, the lookup tables 322 are credit volatility lookup tables 322 that dynamically determine the range of the credit values assigned for the credit symbols (e.g., relatively low, medium, or high game credit values). For example, one lookup table 322 (e.g., lookup table 322C) could be a relatively higher value lookup table where the game processing backend system 314 performs at least one RNG pull to determine the credit values for at least one of the credit symbols. Game processing backend system 314 also performs RNG pulls from a relatively lower value lookup table (e.g., lookup table 322D) for the remaining credit symbols. To present a continuous sequence of credit symbols in a designated order, the game processing backend system 314 sorts the credit values based on the designated order.

The game processing backend system 314 can randomly determine the credit values by a linked credit value determination operation. The game processing backend system 314 could include multiple lookup tables 322 that are logically linked together using one or more logical links implemented, for example by RNG conversion engine 320. The one or more logical links are associated with a prior determined credit value and/or current credit value for credit symbols to identify the next lookup table (e.g., lookup table identifiers) to use for determining the next credit value. In an example implementation, for a given credit symbol within the continuous sequence of credit symbols, the game processing backend system 314 selects a current lookup table 322, which could be an initial lookup table 322 or is based on a credit value assigned to a prior credit symbol. The game processing backend system 314 then performs an RNG pull from the current lookup table 322 to determine the credit value for the current credit symbol and identify the next lookup table 322 for determining the next credit value to the next credit symbol. As an example, based on the determined current credit value, the game processing backend system 314 can select a lookup table 322 with a range of credit values that exceed the current credit value. By doing so, the game processing backend system 314 utilizes the logical links (which may be implemented, for example through logical gates and associated circuits; but which will more commonly be implemented through execution of instructions executing the logical functions) to generate a designated order for the assigned credit values, for example, generating the credit values from a lowest to highest. The linked credit value determination operation, thus, can be a more computationally effective way to present credit values in a designated order without performing a sort operation.

Instead of directly determining the number of credit symbols, the game processing backend system 314 can be configured to indirectly determine the number of credit symbols presented in the continuous symbol sequence supplemental feature. The gaming device can indirectly determine the number of credit symbols by randomly determining the number of credit symbols for a designated set of credit values. In one or more implementations, the game processing backend system 314 randomly determines the number credit symbols for each designated credit value (e.g., 88 credits) using multiple lookup tables 322. Additionally, or alternatively, the game processing backend system 314 can randomly determine the number of credit symbols for multiple credit values (e.g., 88, 188, 288, and 388 credits) with multiple lookup tables. Afterwards, game processing backend system 314 indirectly determines the number of credit symbols by totaling up the number of credit symbols for the different credit values.

For implementations where game processing backend system 314 determines the number credit symbols for a designated credit value, in some implementations, each lookup table 322 can correspond to a designated credit value, or a range of credit values. The lookup table 322 associated with the designated credit value (or range of values) is weighted to determine how many credit symbols will be awarded for the designated credit value. As an example, the game processing backend system 314 could have a designated lookup table 322 for each of the following credit values: 88 credits, 188 credits, 288 credits, 388 credits, 488 credits, 588 credits, 688 credits, and 788 credits. The game processing backend system 314 performs a separate RNG pull from each credit value's lookup table. In particular, game processing backend system 314 performs an RNG pull for the lookup table 322 designated for the 88 credit value, a separate RNG pull for the lookup table 322 designated for the 188 credit value, another separate RNG pull for the lookup table designated for the 288 credit value, and so forth. Based on the RNG pulls, the game processing backend system 314 can randomly determine to assign two credit symbols with the 88-credit value, one credit symbol with the 188-credit value, three credit symbols with the 288-credit value, zero credit symbols with the 388-credit value, and so forth. The game processing backend system 314 subsequently determines the total number of credit symbols for the continuous symbol sequence supplemental feature by totaling up the number of credit symbols for each designated credit value. Having each lookup table 322 correspond to a designated credit value could also prevent game processing backend system 314 from performing a sort operation to produce a designated order.

For implementations where the game processing backend system 314 determines the number of credit symbols for multiple respective credit values, each lookup table 322 can generate a designated range of credit symbols (e.g., 5-10 credit symbols) assigned with multiple credit values. In other words, each lookup table 322 could provide differing ranges of credit values and the number of credit symbols selected to be added to the continuous symbol sequence. Continuing with the example previously disclosed, the game processing backend system 314 could have a lookup table A that randomly determines to add five to ten credit symbols in the continuous symbol sequence and a second lookup table B that randomly determines to add zero to five credit symbols. The credit symbols for lookup table A could generate relatively lower credit values, such as the 88 credit value, 188 credit value, 288 credit value, and 388 credit value while lookup table assigns relatively higher credit values to credit symbols, such as the 488 credit value, 588 credit value, 688 credit value, and 788 credit value. To determine the number of credit symbols and credit values for the credit symbols, the game processing backend system 314 performs two separate RNG pulls, one from lookup table A and the other from lookup table B. The RNG pull from lookup table A randomly could determine that seven credit symbols with credit values ranging from 88 credits to 388 credits should be added to the continuous symbol sequence. The other RNG pull for lookup table B determines that four additional credit symbols will be added to the continuous symbol sequence with credit values that range from 488 credits to 788 credits. The continuous symbol sequence, thus, would include a total of 11 credit symbols. Because each lookup table 322 corresponds to multiple credit values, the game processing backend system 314 could perform a sort operation to produce a designated order.

Figure 4:
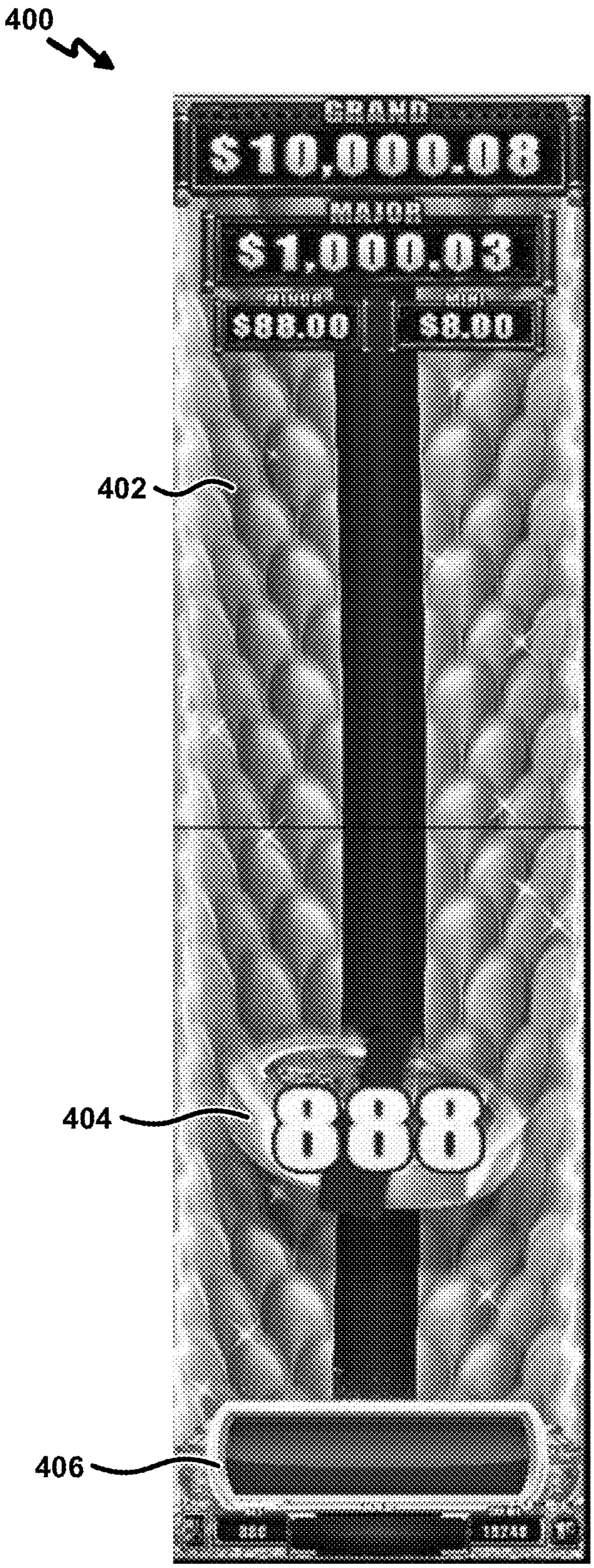
FIG. 4 is a diagram that depicts an example screenshot of a UI related to presenting a continuous symbol sequence supplemental feature.
Figure 5:
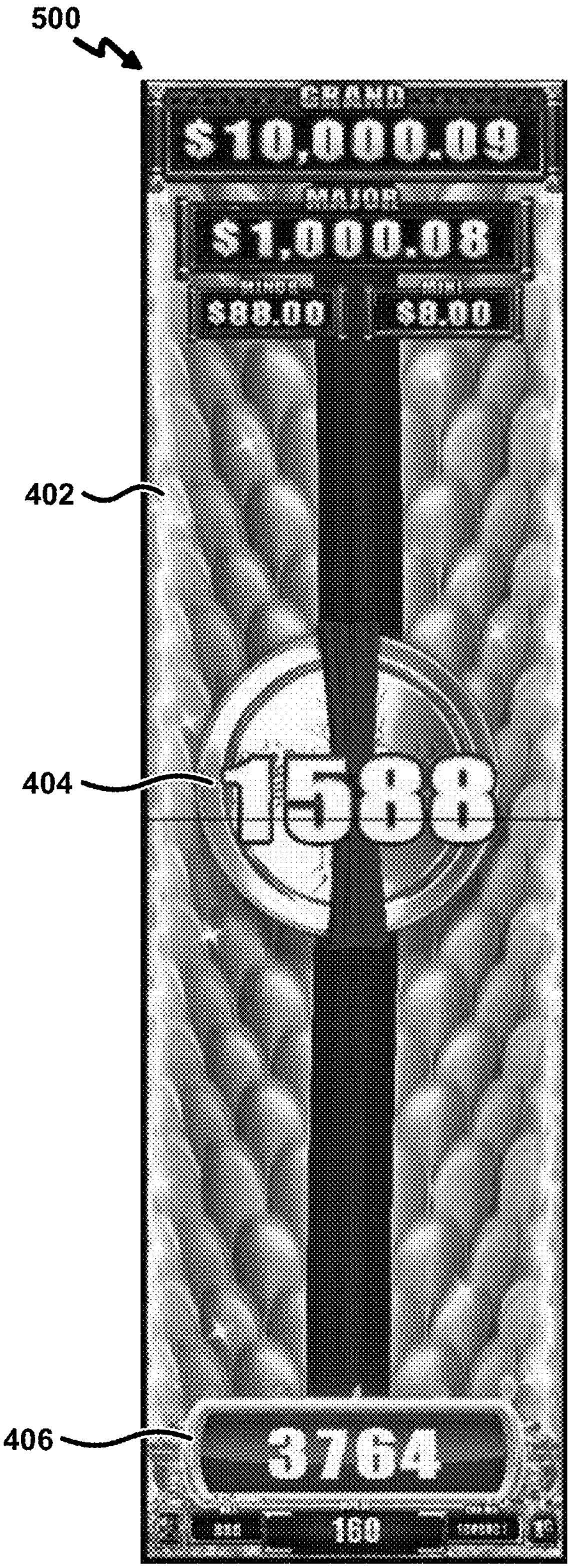
FIG. 5 is another diagram that depicts an example screenshot of a UI related to presenting a continuous symbol sequence supplemental feature.
Figure 6:
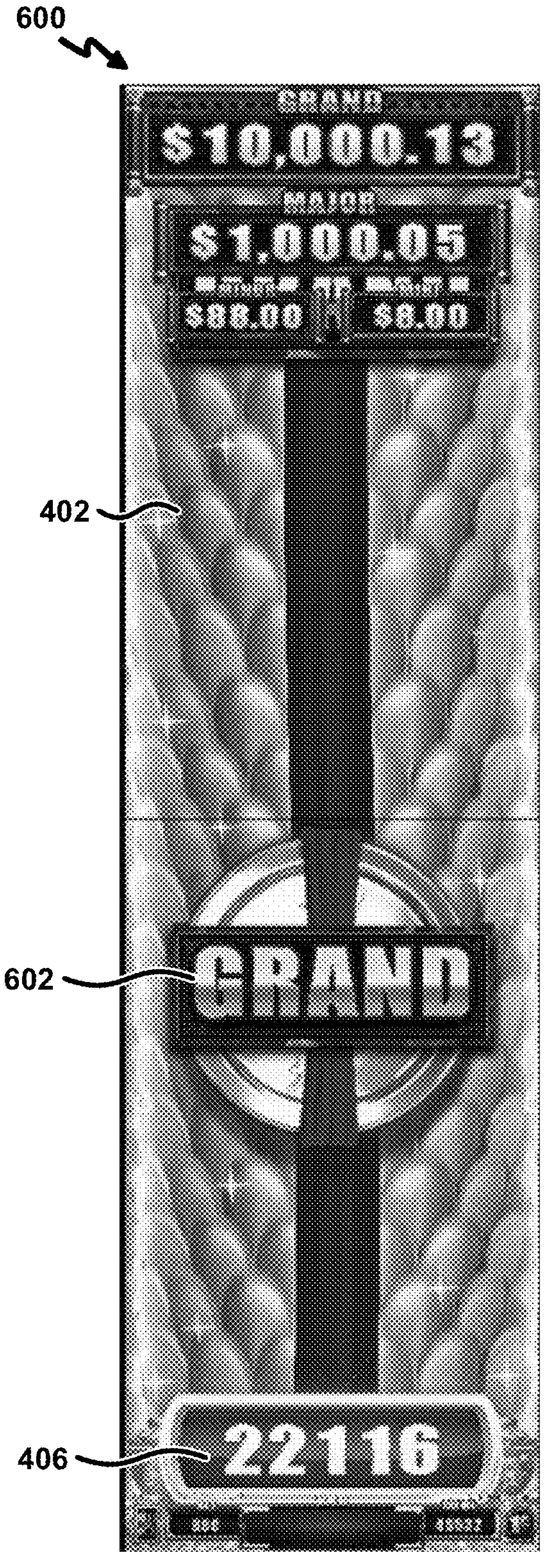
FIG. 6 is another diagram that depicts an example screenshot of a UI related to presenting a continuous symbol sequence supplemental feature.

FIGS. 4-6 are diagrams that depict example screenshots of UIs related to presenting a continuous symbol sequence supplemental feature. A gaming device can present the continuous symbol sequence supplemental feature when executing a game program. Using FIG. 2A as an example, when a gaming device 200 executes game program 206, the gaming device 200 displays bonus game play UIs 400, 500, and 600 on primary game display 240 and/or secondary game display 242. Additionally, or alternatively, at least some or all portions of the bonus game play UIs 400, 500, and 600 could be presented on mechanical reels and/or other types of mechanical and/or electro-mechanical components not shown in FIG. 2A.

In FIGS. 4-6, bonus game play UIs 400, 500, and 600 includes an animation object 402 that moves in one or more directions. In FIGS. 4-6, bonus game play UIs 400, 500, and 600 shows that the animation object is moving in a downward direction. On top of the animation object 402 are credit symbols 404 with assigned credit values. As the animation object 402 moves toward the given direction, the credit symbols 404 pop off the animation object and the corresponding credit values are added to the payout meter 406. The bonus game play UI 400 shows the first credit value for the continuous symbol sequence, and the bonus game play UI 500 shows a subsequent credit value for the continuous symbol sequence. As shown in FIGS. 4 and 5, the credit value shown bonus game play UI 400 is less than the credit value shown in bonus game play UI 500. Bonus game play UI 600 shows that a jackpot symbol 602 can also be included in the continuous symbol sequence. Other implementations of bonus game play UI 600 could include other symbol types in addition to credit symbols 404 and jackpot symbol 602. In selected examples, the configuration and presentation of the animation may be controlled to display individual credit values in the sequence for non-uniform periods of time. For example, gameplay UI 304 or bonus gameplay UI 308 may display one or more credit symbol values for an extended period of time relative to other credit symbol values. In one example, symbol values above a randomly or preset threshold value may display for an additional 1-3 seconds (or longer) relative to a preceding symbol value. Similarly, in examples in which prizes are selected from multiple tiers, prizes from a relatively higher value tier (either all prizes awarded from the tier or individually selected prizes) may be displayed for a longer interval than prizes from a relatively lower value tier.

Figure 7:
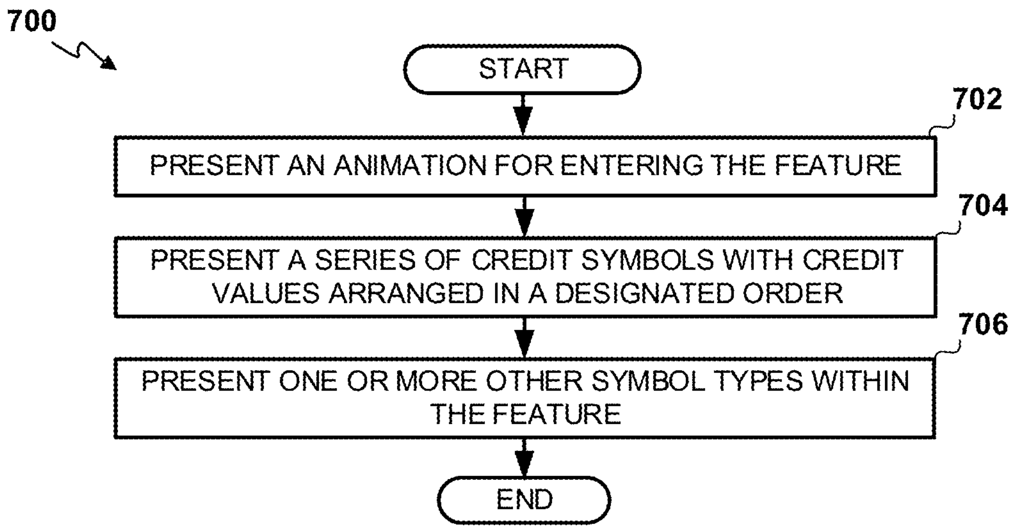
FIG. 7 depicts a flowchart illustrating a UI based operation for presenting a continuous symbol sequence supplemental feature triggered from a base game and/or supplement game feature.

FIG. 7 depicts a flowchart illustrating a UI based operation 700 for presenting a continuous symbol sequence supplemental feature triggered from a base game and/or supplement game feature. In one or more implementations, the UI based operation 700 may be implemented by a UI system 302 shown in FIG. 3 and/or displayed on the primary game display 240 and secondary game display 242 of a gaming device 200 shown in FIG. 2A. The UI based operation 700 also corresponds to the bonus game play UIs shown in FIGS. 4-6. The use and discussion of FIG. 7 is only an example to facilitate explanation and is not intended to limit the disclosure to this specific example. Specifically, UI based operation 700 does not necessarily need to perform the sequence of blocks in the order as depicted in FIG. 7. As an example, UI based operation 700 may implement blocks 704 and 706 concurrently rather than sequentially. Additionally, or alternatively, one or more of the blocks may be optional and may not be performed in all implementations of UI based operation 700. For example, block 706 may be optional and may not be performed if no other symbol types are presented in the continuous symbol sequence supplemental feature.

UI based operation 700 may start at block 702 to present an animation for entering the continuous symbol sequence supplemental feature. When presenting the animation, UI based operation 700 may transition from a base game and/or supplemental game feature to the continuous symbol sequence supplemental feature. At block 704, UI based operation 700 presents a series of credit symbols with credit values arranged in a designated order. As previously discussed, UI based operation 700 may arrange the credit symbols from the lowest credit value to the highest credit value or vice versa. Other implementations could arrange the credit symbols in other manners when presenting the series of credit symbols. From block 704, the UI based operation 700 could move to block 706 to present one or more other symbol types within the continuous symbol sequence supplemental feature. Examples of other symbol types could include one or more other jackpot symbol types, such as a Mini jackpot symbol, Minor jackpot symbol, Major jackpot symbol, and Grand jackpot symbol.

Figure 8:
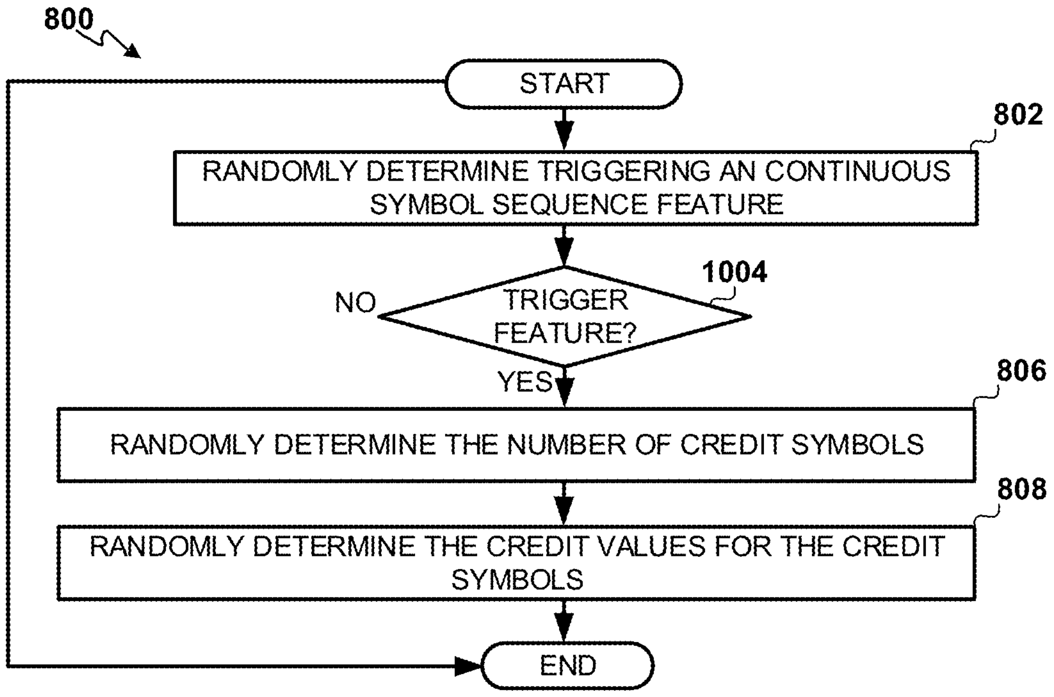
FIG. 8 depicts a flowchart illustrating backend-based operation for implementing one or more continuous symbol sequence mechanics.

FIG. 8 depicts a flowchart illustrating backend-based operation 800 for implementing one or more continuous symbol sequence mechanics. For example, backend-based operation 800 could include a linked credit value determination operation or a sort operation that supports the UI based operation 700 discussed with reference to FIG. 7. In one or more implementations, backend-based operation 800 may be implemented by a game processing backend system 314 shown in FIG. 3 and/or by a game controller 202 shown in FIG. 2A. The use and discussion of FIG. 8 is only an example to facilitate explanation and is not intended to limit the disclosure to this specific example. In particular, backend-based operation 800 does not necessarily need to perform the sequence of blocks in the order as depicted in FIG. 8. As an example, backend-based operation 800 shown in FIG. 8 may implement blocks 804 and 808 concurrently rather than sequentially.

Backend-based operation 800 may start at block 802 to randomly determine triggering a continuous symbol sequence supplemental feature. With reference to FIG. 3, backend-based operation 800 may use a lookup table to map the RNG outcome to a decision on whether to trigger the continuous symbol sequence supplemental feature. Other implementations of backend-based operation 800 could determine whether to trigger the continuous symbol sequence supplemental feature based on a generated random based game outcome and/or a separate RNG outcome. At block 804, backend-based operation 800 determines that if no continuous symbol sequence supplemental feature triggers, backend-based operation 800 ends. Otherwise, backend-based operation 800 may move to block 806.

At block 806, backend-based operation 800 randomly determines the number of credit symbols directly or indirectly. For example, backend-based operation 800 can directly determine the number of credit symbols to include the continuous symbol sequence based on a random based game outcome and/or a random RNG pull separate and independent of the RNG pulls for the random based game outcome. At block 808, backend-based operation 800 then randomly determines the credit values for the credit symbol. To randomly determine the credit values, backend-based operation 800 could perform a linked credit value determination operation that logically links multiple lookup tables 322 using lookup table identifiers and based on current and/or prior credit values. Other implementations could randomly determine the credit values and/or be based on a designated number of credit values (e.g., 88 credits, 188 credits, 288 credits, etc.).

FIGS. 9A-C depict a functional representation of a dynamic lookup table 900 for implementing continuous symbol sequence mechanics, depicted at multiple illustrative stages. As depicted in the functional representation, for purposes of example, individual integers, in column 902, are associated with respective symbol values, as indicated in column 904, and with respective probabilities, as may be assigned, in column 906. Individual integers of column 902 may be selected by an RNG call to determine a value to be presented in a continuous symbol sequence.

For purposes of the described example, integers of column 902 are consecutive, and will be described as having respective associated probabilities (represented here as a percentage value). As will be apparent to persons skilled in the art having the benefit of the present disclosure, a lookup table may be configured in alternative ways to establish a probability associated with a respective number/symbol value. For example, as indicated at 910, a range of integers (such as 1-10, or a much greater number) may be associated with a first symbol value ("a1"); while another integer or range of integers (such as 100-102) might be associated with a second symbol value to establish a probability for the second symbol value, which further establishes a weighting between the first symbol value and the second symbol value. For purposes of illustration, column 902 includes a range of integers (1-100) used for the present description (and above 10, each integer associated is with a respective symbol value); though a much greater range of integer values, and a much greater range of symbol values may be represented in an actual implementation. In column 904, symbol values are represented in a generally increasing order of value. Symbol values may increase by a uniform increment (across at least a portion of the range of symbol values (such as increments of 1, or 4, for example), or by a non-uniform increment; or by a uniform or non-uniform multiplication factor; or by individual symbol values established independent from other symbol values (such as the above discussed predetermined values of 88, 188, 288, etc.).

As indicated at 916, the table entry associated with integer "30" having a symbol value of "a2" has been selected, for example by an RNG call, for example by RNG correlation engine 320. Game processing backend system 314 may, in some examples, set a flag associated with table entry 30, recording the selection. In other examples, the selection of table entry 30 may be recorded in a buffer, to record symbol value a2 as a first selected value.

Referring now to FIG. 9B, in response to the selection of table entry 30, as indicated by a flag, buffer entry, or other recording of data in memory, or other temporary or permanent storage (generically referred to herein as "selection data"), dynamic lookup table 900 can, through use of one or more logical links responsive to the selection data, reconfigure data table 900 to mask table entries at least beneath table entry 916, to preclude selection of entries associated with values less than that of previously-selected table entry 30 (and in the depicted example, the mask further extends to table entry 30, to assure that a subsequent entry selection will have an associated value greater than that associated with table entry 30). In some examples, a subsequent RNG call providing a number 1-30 (masked from selection) may prompt a further RNG call until a number at least equal to 31 results. In other examples, reconfiguration of data table 900 may include reconfiguring the table to allocate RNG values correlating to integers 1-30 to unmasked table entries. As one example, the reconfigured dynamic table of FIG. 9B, may further associate any of masked integers 1-30 with table entry 31.

A subsequent selection of table entry 61 of FIG. 9B, may then, in a similar manner, result in masking of all tiers beneath, or potentially including, selected table entry 61. In other examples, the dynamic reconfiguring of the table 900 may include further masking values greater than a selected table entry by a selected increment (for example 5), so as to establish a minimum increment of a subsequent symbol value over the preceding selected symbol value, by only allowing selection of table entries below or equal to 66.

In many implementations, dynamic table 900 will automatically reconfigure for a subsequent value determination, until all needed symbol values are determined. For example, the determination of a first symbol value, such as may be indicated by selection data as discussed above, will trigger the described reconfiguration for determining a subsequent value.

The use of a single table for all symbol values as described relative to FIGS. 9A-C, may not provide a desired level of control over RTP for all requirements, as the established probabilities in relatively higher value table entries remain constant, as relatively lower value table entries are selected or masked off. One solution to this problem can be found in using multiple logically linked tables, as will be discussed further in reference to FIGS. 11-12. However, another solution that can provide greater granularity of control, is to dynamically configure a single table (or multiple tables if desired), to define tiers of credit symbol values, and determining (in some cases at random) a number of table entries to be selected within each tier. The number of table entries within one or more the tiers may be fixed, or may be randomly selected, in response to an additional lookup table.

Figure 10B:
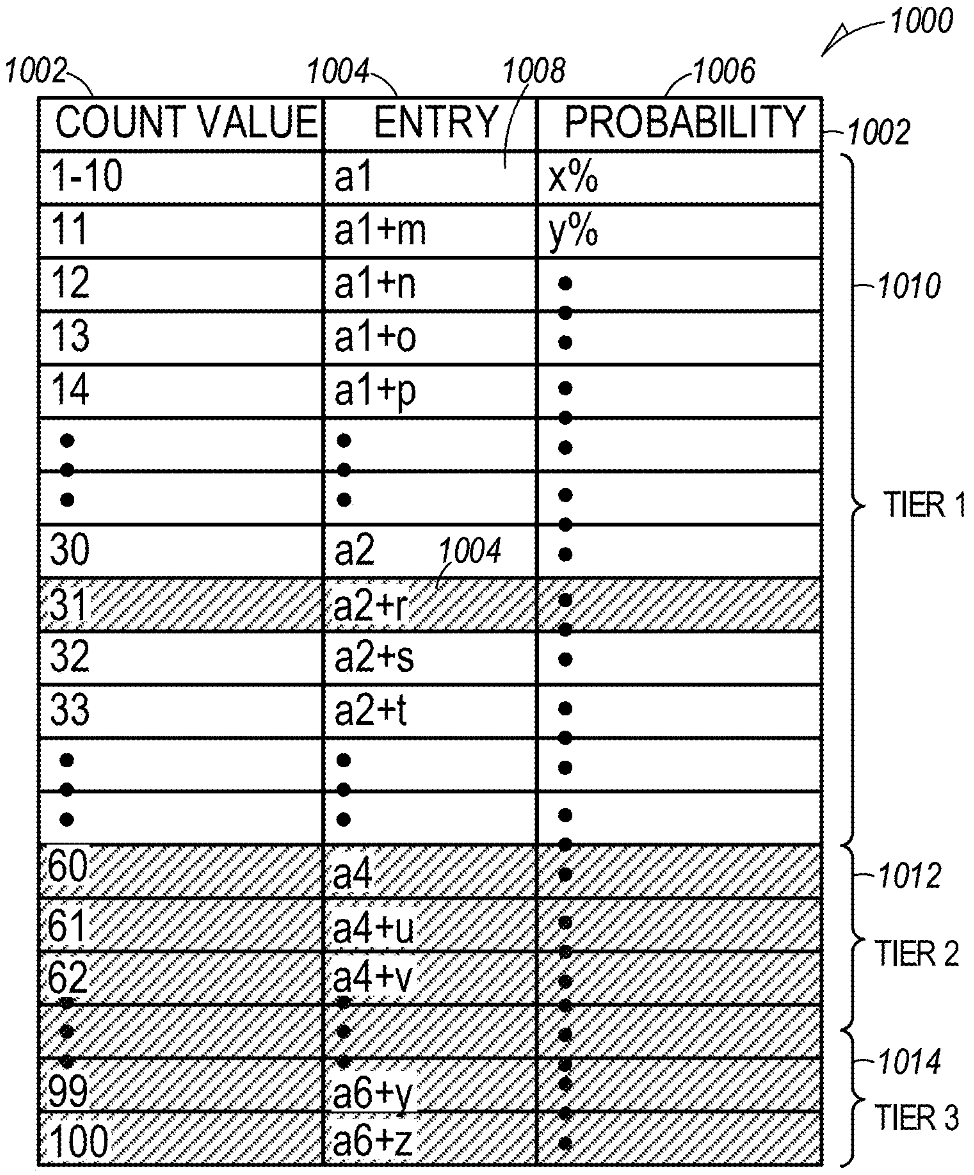
Figure 10C:
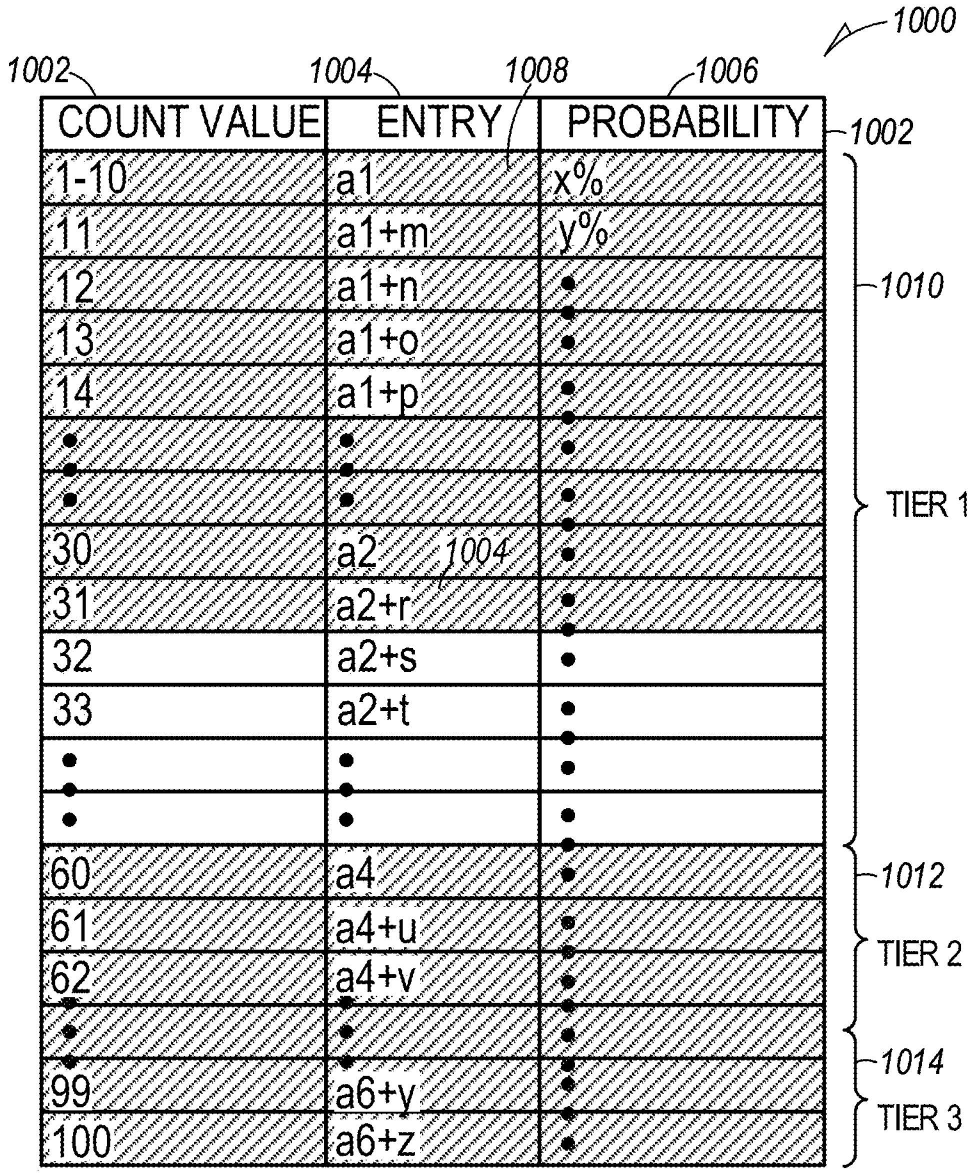
Figure 10D:
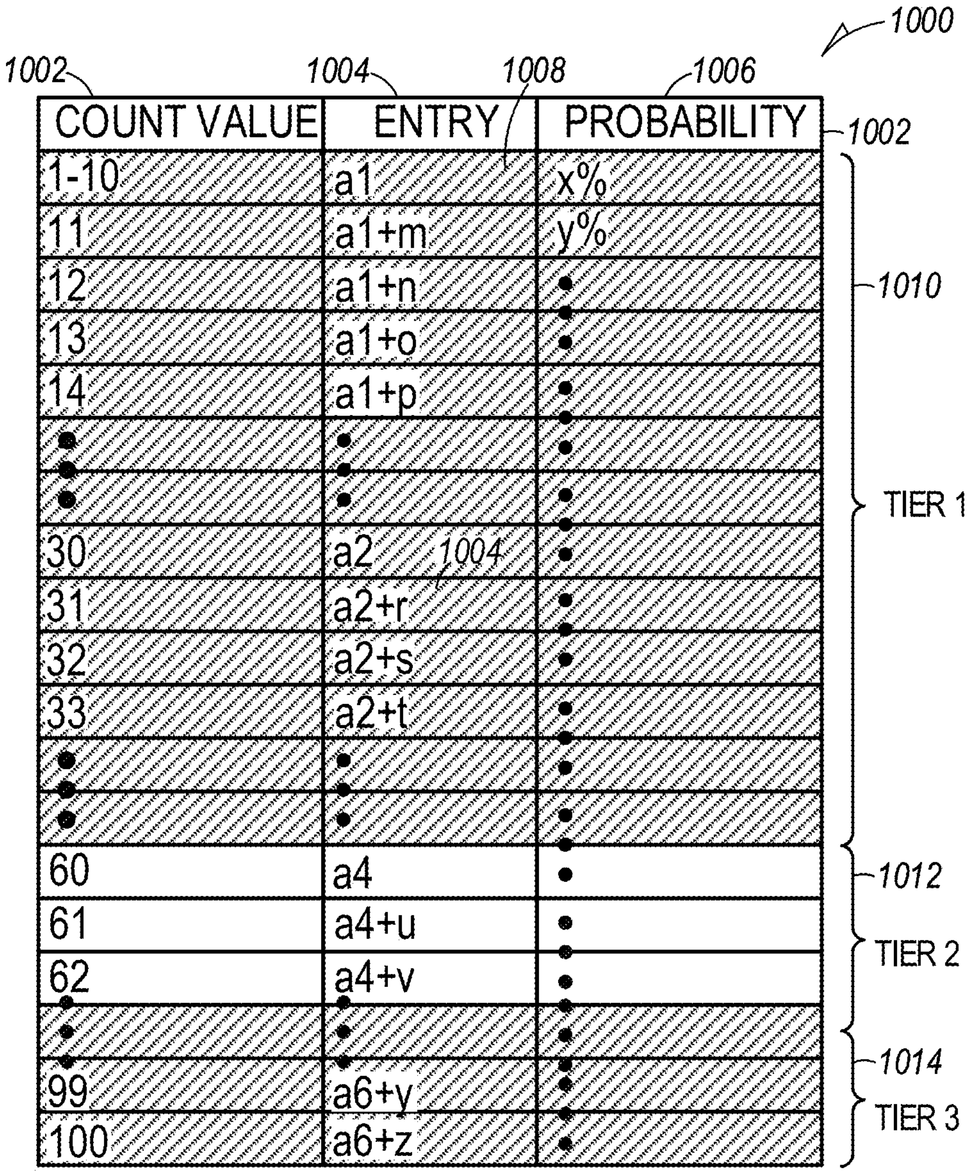

Accordingly, referring now to FIGS. 10A-D, the figures depict a logical representation of implementation of an alternative form of dynamic lookup table 1000; as may be utilized by game processing backend system 314. Dynamic lookup table 1000 provides first, second, and third tiers of prize awards, as indicated at 1010, 1012, and 1014, respectively. In order to selectively allow selection of prizes from only the first tier, table entries associated with second tier 1012 and third tier 1014 are masked from selection, which masking may be in response to selection data, in a manner analogous to that discussed with respect to FIGS. 9A-C. Selection of individual table entries may be performed in a manner analogous to that discussed with FIGS. 9 A-C. Accordingly, as depicted in FIG. 10B, table entry 1016 associated with integer "31" may be selected by an RNG call. Where multiple values are to be selected within an available tier, the selections may be made within the range of table entries within the tier, in the manner described relative to FIGS. 9 A-C. For example, as depicted in FIG. 10C, table entries associated with values less than that of selected entry 1016 may then be masked from selection. As identified previously, this masking allows a potential for repeated selection of the selected entry (and associated value) 1016.

Assuming for purposes of the present example, that the selection of entry 1016 is the last selection to be made from first tier 1010, dynamic table 1000 will dynamically reconfigure to mask table entries within the first tier 1010, while unmasking table entries within the second tier 1012, while leaving table entries associated with the third tier 1014 masked from selection. This reconfiguration of dynamic table 1000 allows selection of only table entries within the second tier 1012. Once the last selection from the second tier 1012 is made, dynamic table 1000 will reconfigure to mask table entries of the second tier, and to unmask table entries of the third tier.

The above table reconfiguration can be configured to implement a variable number of tiers, and a variable number of selections from one or more of such tiers. The use of multiple tiers allows selection of multiple symbol values to be displayed with sufficient variability for player interest, while establishing a distribution across a range of values to improve granularity of control over RTP. As an alternative, and as discussed relative to FIG. 7, entries within a lookup table or tier of a lookup table can be determined in a random order (not necessarily in incrementing order of symbol value), and sorted to obtain an incrementing order of value.

In some gaming systems, the multiple determinations of a multi-stage incrementing value can be determined from multiple logically linked tables, rather than through use of a single table as described relative to FIGS. 9A-C and 10A-D. The use of multiple logically linked tables may provide relatively improved computational efficiency, for example, where there is wide variability in the number of stages of symbol values to be determined. Depending upon hardware configuration of a backend processing system 314 sequential loading and use of logically linked lookup tables may be more efficient than loading and reconfiguring a single table addressing all stages of symbol values to be determined.

Figure 11:
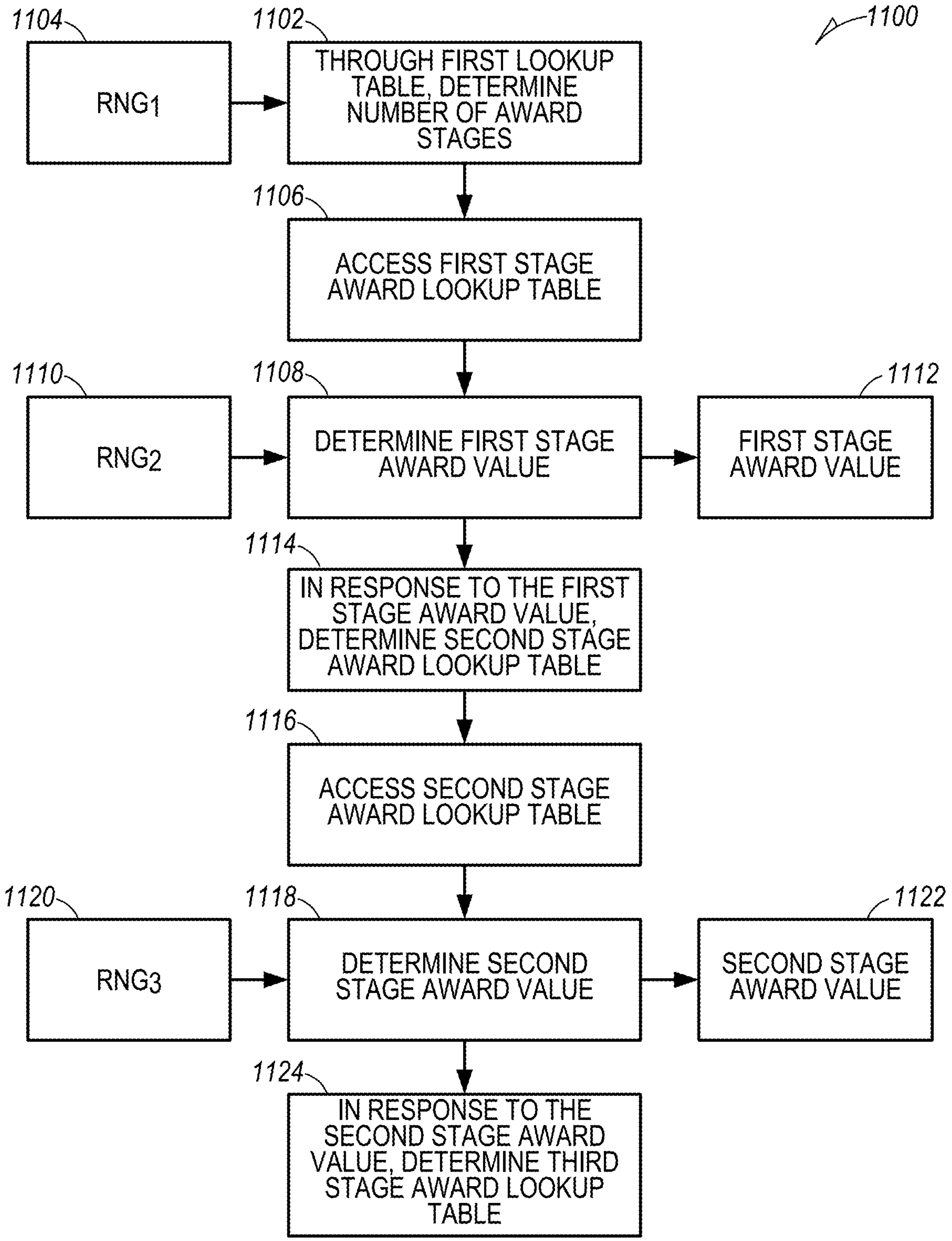
FIG. 11 depicts an example process for using multiple dynamic lookup tables to implement continuous symbol sequence mechanics.
Figure 12:
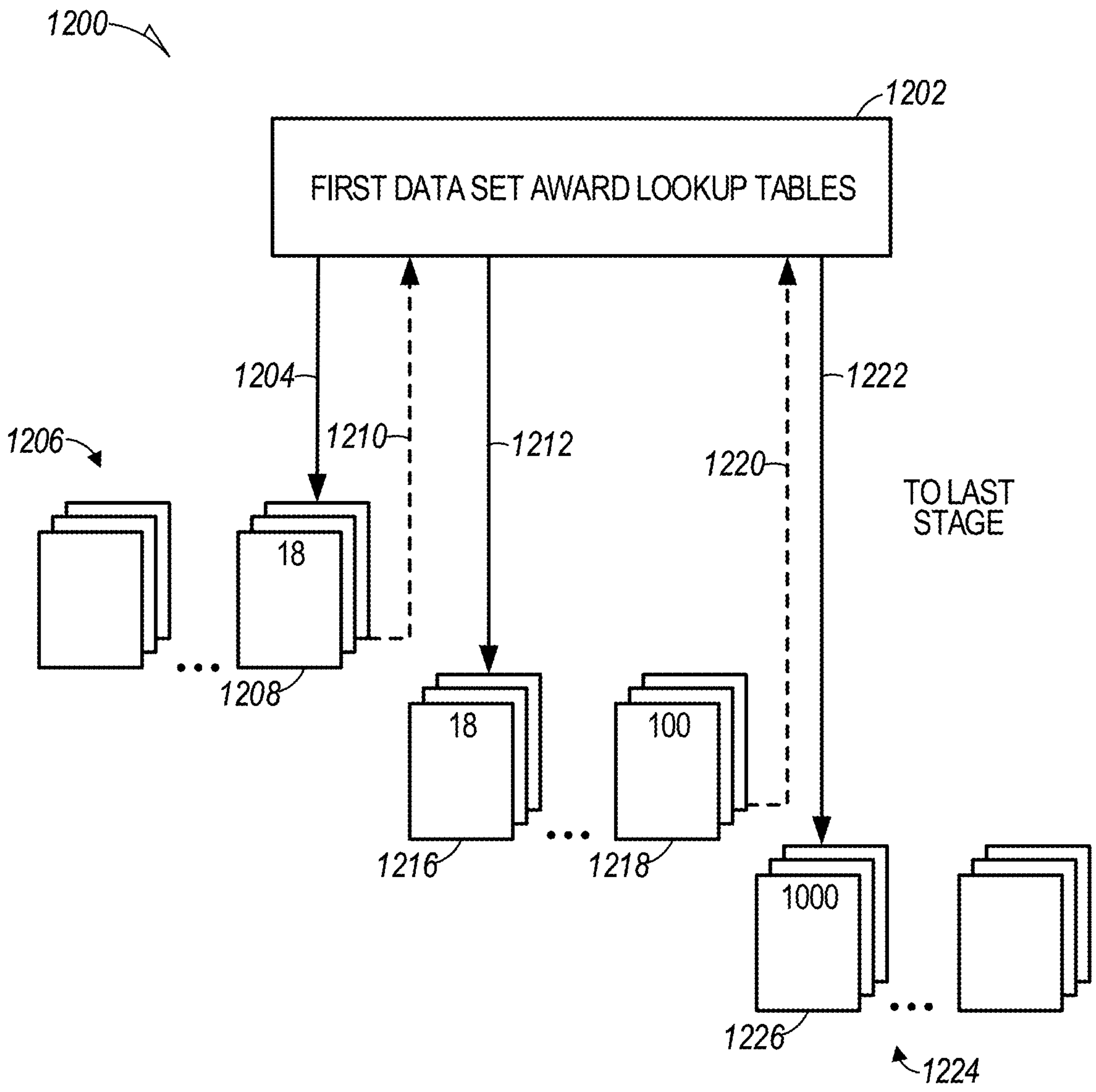
FIG. 12 graphically represents an example implementation of multiple dynamic lookup tables in accordance with the process of FIG. 11.

Referring now to FIGS. 11 and 12, FIG. 11 depicts an example process for using multiple dynamic lookup tables to implement continuous symbol sequence mechanics; and FIG. 12 graphically represents an example implementation of multiple dynamic lookup tables as may be implemented through the example process of FIG. 11. Once a determination is made to award a continuous symbol sequence supplemental feature, the operations of process 1100 can be initiated. In various implementations, the operations of process 1100, once initiated may progress through to completion automatically, in which each determination as described below can be used to trigger a following determination until awards have been determined for each stage. In process 1100, through use of at least a first RNG call $RNG_1$ (1102), a determination may be made through a first lookup table, as indicated at 1104, of a number of award stages to be provided. In some examples, this may be relatively simple determination of N award stages. In other examples, this determination may include: (i) identifying a number of tiers (and potentially selecting specific individual tiers from a potentially greater number of potential tiers), from which prizes will be awarded and/or (ii) identifying a number of prizes from one or more (or all) of the identified tiers.

In embodiments determining stage award values in order of increasing value, a first stage award lookup table may be accessed 1106. In implementing the alternatives discussed above, the first stage award lookup table may be identified in response to applicability of the lookup table to a lowermost value tier. In other examples, the first stage award lookup table may be selected or configured in reference to one or more alternative factors, for example to the determined number of award stages to be provided. For example, a first configuration of the first lookup table may be accessed for the first award stage of seven award stages; while a differently configured first lookup table could be accessed for the first award stage of 14 award stages. Alternatively, a first configuration of the first lookup table may be accessed if one prize is to be a selected from the table, while a second configuration of the first lookup table may be accessed if three prizes are to be selected from the table (for example 3 prizes from an initial tier).

As a result, in selected embodiments, such as example system 1200 depicted in FIG. 12, a first data structure may include multiple sets of lookup tables from which an individual stage lookup award table may be selected. In the depicted example, a first data set 1202 (which for example may be retained within RNG conversion engine 320) can include a first set of lookup tables 1206, for example for a first tier of awards, wherein the first set of lookup tables includes individual lookup tables configured for use for different numbers of total award stages. In such examples, such as the process 1100, in which the total number of award stages is determined (1102), a first lookup table 1208 may be selected from the first set of lookup tables 1206 in response to the determined total number of stages. In some implementations, subsequent lookup tables may be selected in response to one or both of: the individual award stage and the total number of award stages (i.e., a fourth stage of eight stages), In the depicted example, a first lookup table 1208 is accessed (which may include loading into active memory) in response to $RNG_2$ call (1110) to determine an integer of a first lookup table to determine a first stage award value (at 1108), (in the example of FIG. 12, "18," associated with a first entry/symbol value in lookup table 1208). After determining of a first stage award value at 1108, the first stage award value may be stored, for example in a register, for subsequent use, for example by a UI system (302).

As can be seen from FIG. 12, determination of that first stage award value logically triggers, as indicated by dashed line 1210, configuration of one or more lookup tables of a second set of lookup tables, indicated generally at 1216. One or more lookup tables of the second set of lookup tables 1216, may be selected and/or may be configured in response to the first determined stage award value (18). In the depicted example, the second set of lookup tables 1216 will be dynamically configured to start with a value equal to (or above), the first stage award value. In some examples, the first and second sets of lookup tables may each include common range of symbol values (such as values in a single tier of award values). When first and second lookup tables have a common range of values, dynamic configuration of the second lookup table can yield a subset of the values originally present in the first lookup table. However, different tables may present different ranges of symbol values, and/or may provide different probabilities for selection of symbol award values. In the depicted example, in response to $RNG_3$ call (1120), an integer "100" has been determined from the selected second lookup table 1218 to determine a second stage award value (1118), which again may be output to a register or other storage (1122).

Process 1100 of FIG. 11 can continue in a similar manner to determine stage award values for additional stages (1124) until a symbol value is determined for the last stage of the determined number of award stages. As depicted in FIG. 12, relative to a third set of lookup tables, indicated generally 1224, the range of symbol values for the lookup tables of a subsequent stage may cover a different range of values than for prior stages. In the depicted example, integers starting at 1000 for the third set of lookup tables, as shown on an individual lookup table 1226, may offer a substantially greater symbol values, in many examples, with a corresponding lower probability.

In some implementations of a multi-table system such as FIG. 12, the implementation can be simpler, using only a respective table for different determinations in the sequence (rather than a set of tables). Use of individual tables may offer more generalized control over RTP, that might be achieved with some forms of sets of configurable tables, though offering computing efficiency by simplifying the logical links between tables for the sequential determinations.

Figure 13:
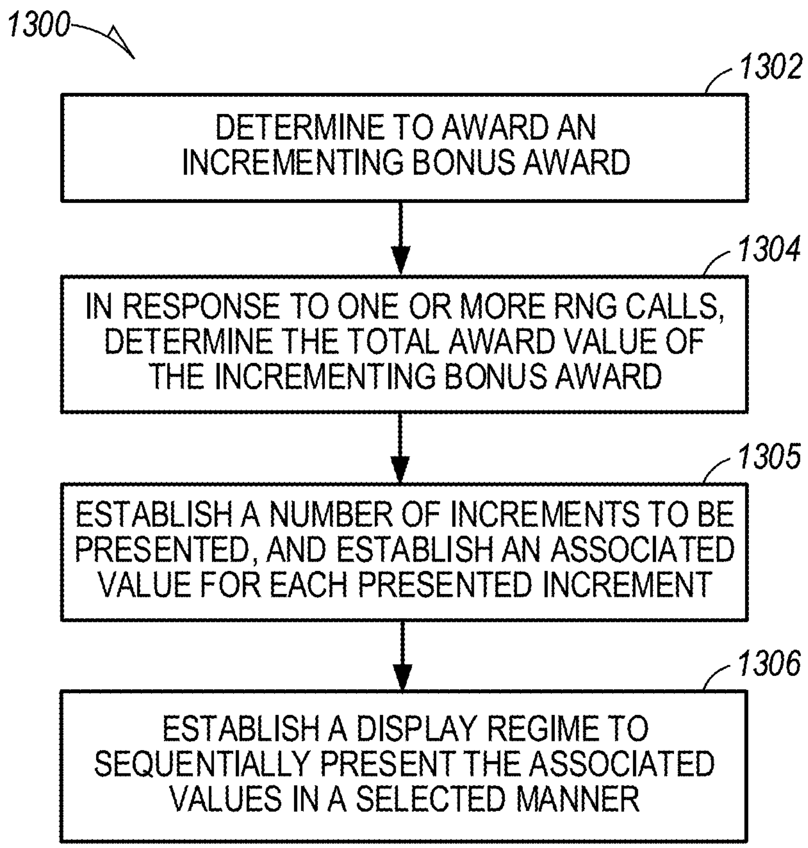
FIG. 13 depicts a flowchart illustrating backend-based operation for an alternative implementation of continuous symbol sequence mechanics utilizing a predetermined total award value.

Referring now to FIG. 13, the figure depicts an example process 1300 for an alternative implementation for providing a continuous symbol sequence without reliance on dynamic lookup tables. As noted earlier herein, some jurisdictions impose a maximum value that can be awarded by a gaming machine/system, which can complicate the design and configuration of dynamic (logically linked) lookup tables as described above, and can adversely impact the range and size of the determined awards (the apparent volatility). A technical solution to solution to this additional consideration is to decouple a determined value of the continuous symbol sequence feature from the presentation to a player of incremental values resulting in that total value. In an example implementation, a determination is made to award a continuous symbol sequence feature (which as noted above can be determined in reference to a lookup table), as indicated at 1302. Then, in response to one or more RNG calls, a total award value for the continuous symbol sequence feature may be determined, as indicated at 1304, most commonly in response to a data structure including one or more lookup tables for such determination (though a single lookup table will be sufficient for many implementations).

Additional determinations may be made, as indicated at 1305, to determine a number of incremental values that will be used to present the previously determined total value, and the associated symbol value for each increment; and as indicated 1306, a display regime to sequentially present the values in the selected manner may then be determined. In some examples, the number of incremental values and the corresponding symbol values may be determined through one or more lookup tables, through one or more RNG calls. Alternatively, a data structure including one or more lookup tables configured to provide desirable symbol values and sequences, may be utilized to provide predetermined display regimes, from which an appropriate display regime (number of stages and displayed symbol values) may be selected.

Alternatives and Variations

Numerous embodiments are described in this disclosure and are presented for illustrative purposes only. The described embodiments are not, and are not intended to be, limiting in any sense. As an example, although the disclosure generally describes the continuous symbol sequence mechanics in a Class III reel or slot game context the disclosure is not limited to this type of game and/or gaming device. For example, other implementations and/or portions of the continuous symbol sequence mechanics may be implemented as a Class II gaming device. In particular, a gaming device may present game play UIs and bonus game UIs while implementing a Class II bingo game. Additionally, or alternatively, portions of the continuous symbol sequence mechanics can be utilized for other types of wagering game, such as keno, lottery, and pachinko.

The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments. Headings of sections provided in this disclosure are for convenience only and are not to be taken as limiting the disclosure in any way.

When an ordinal number (such as “first,” “second,” “third” and so on) is used as an adjective before a term, that ordinal number is used (unless expressly specified otherwise) merely to indicate a particular feature, such as to distinguish that particular feature from another feature that is described by the same term or by a similar term. For example, a “first widget” may be so named merely to distinguish it from, e.g., a “second widget.” Thus, the mere usage of the ordinal numbers “first” and “second” before the term “widget” does not indicate any other relationship between the two widgets, and likewise does not indicate any other characteristics of either or both widgets. For example, the mere usage of the ordinal numbers “first” and “second” before the term “widget”” (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers “first” and “second” before the term “widget” does not indicate that there must be no more than two widgets.

When introducing elements of aspects of the present disclosure or embodiments thereof, the articles “a,” “an,” “the,” and “said” are intended to mean that there are one or more of the elements. The terms “comprising,” including,” and “having” are intended to be inclusive and mean that there may be additional elements other than the listed elements.

When a single device, component, structure, or article is described herein, more than one device, component, structure, or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like “determine” and “select” to describe computer operations in a computer system. These terms denote operations performed by a computer and should not be confused with acts performed by a human being. The actual computer operations corresponding to these terms vary depending on implementation. For example, “determining” something can be performed in a variety of manners, and therefore the term “determining” (and like terms) can indicate calculating, computing, deriving, looking up (e.g., in a table, database or data structure), ascertaining, recognizing, and the like.

As used herein, the term “send” denotes any way of conveying information from one component to another component, and the term “receive” denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term “connected” denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to ensure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input, and output devices) appropriate to perform the process. A computer-readable medium can store program elements appropriate to perform the method.

The term “computer-readable medium” refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term “computer-readable media” excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

Other example implementations may be adopted, such as a gaming system or method, or machine-readable media storing instructions or otherwise configured to perform operations which include: randomly triggering, based on a random number generator, a continuous symbol sequence supplemental game feature; randomly determining, based on the random number generator, and triggering a continuous symbol sequence supplemental game feature, including determining a number of credit symbols to add to a continuous symbol sequence. The operations may then further include randomly determining, based on the random number generator, the credit values for the credit symbols; and presenting the continuous symbol sequence, wherein the credit values of the credit symbols in the continuous symbol sequence is arranged in a designated order.

While the invention has been described with respect to the figures, it will be appreciated that many modifications and changes may be made by those skilled in the art without departing from the spirit of the invention. Any variation and derivation from the above description and figures are included in the scope of the present invention as defined by the claims. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A gaming system, comprising:

a user interface system configured for receiving an indication to initiate one or more instances of a slot game;

a display system comprising one or more displays; and a control system comprising:

one or more processors; and a memory storing one or more dynamic data structures, comprising a first data structure including at least a first lookup table having entries establishing probabilities and values of possible awards correlated with respective numerical values, wherein the control system executes instructions that cause the control system to perform operations, comprising:

presenting a game instance;

determining an instance outcome including display symbols selected from a symbol set;

in response to determining the instance outcome, controlling the display system to display the display symbols associated with the instance outcome;

after determining the instance outcome, automatically determining whether a multi-stage incrementing feature will be awarded;

in response to determining that a multi-stage incrementing feature will be awarded, automatically determining award values for multiple respective stages of the multi-stage incrementing feature, comprising:

correlating a respective random number generator (RNG) call with numerical values of the first data structure to determine a stage award value associated with the correlated numerical value; and in response to determining the stage award value, modifying the first data structure to limit selection of entries for a following stage to entries associated with award values at least equal to the determined first stage award value; and controlling the display system to sequentially display the multiple determined stage award values, wherein sequentially displaying the multiple determined stage award values comprises controlling the display system to:

display a first stage award value for a first time interval at a first position on an animation object that is displayed on one of the one or more displays;

animate the animation object to move in a first direction from the first position to a second position; and display a second stage award value on the animation object for a second time interval at the second position.

2. The gaming system of claim 1, wherein the first data structure comprises a single lookup table, and wherein the operations further comprise, after determining a stage award value, masking entries in the lookup table associated with award values that are less than the determined stage award value.

3. The gaming system of claim 1, wherein the first data structure comprises multiple lookup tables and wherein the operations further comprise, after determining a stage award value, accessing a further lookup table having only entries associated with award values that are at least as great the award value of the determined stage award value.

4. The gaming system of claim 3, wherein a first stage award value is determined in response to a first lookup table having entries associating respective probabilities and award values with each numerical value in a first set of numerical values.

5. The gaming system of claim 4, wherein a second stage award value is determined in response to a second lookup table having entries associating respective probabilities and award values with numerical values in a first subset of numerical values from the first set of numerical values of the first lookup table.

6. The gaming system of claim 5, wherein the probabilities of one or more numerical values in entries of the first subset in the second lookup table are different from the probabilities associated with such numerical values in entries of the first lookup table.

7. The gaming system of claim 1, wherein the first data structure comprises multiple lookup tables and wherein the operations further comprise, after determining a stage award value in response to a first entry of a first lookup table, automatically accessing a second lookup table of the first data structure determined in response to the first entry.

8. The gaming system of claim 1, wherein the memory further stores a second data structure comprising a lookup table containing entries associating probabilities of awarding possible numbers of stages of the multi-stage incrementing feature, and wherein the operations further comprise, after determining that a multi-stage incrementing feature will be awarded, associating a further RNG value with the second data structure to determine the number of stages to be awarded.

9. The gaming system of claim 8, wherein the first data structure comprises multiple tiers of stage award values, and wherein the operations further comprise determining the number of stages to be awarded from individual tiers of the multiple tiers of stage award values.

10. The gaming system of claim 9, wherein the first data structure comprises a single lookup table, and wherein the operations further comprise:

after determining the number of stages to be awarded from respective tiers of the multiple tiers of stage award values, masking entries of the single lookup table not associated with a first tier of stage award values;

associating one or more RNG values with unmasked entries of the lookup table, to determine stage award values from the first tier;

masking entries of the lookup table not associated with a second tier;

and associating one or more RNG values with unmasked entries of the lookup table to determine stage award values from the second tier of stage award values.

11. The gaming system of claim 10, further comprising:

after associating a first RNG value with an unmasked entry of the lookup table to determine a first stage award value, masking entries associated with the first tier of stage award values and having a value lower than the first stage award value; and associating a second RNG value with still unmasked entries of the lookup table associated with the first tier of stage award values, to determine a second stage award value from the first tier having a value at least equal to the first stage award value.

12. The gaming system of claim 9, wherein the operations further comprise: determining a first stage award value from a first tier of the multiple tiers; and determining a second stage award value from a second tier of the multiple tiers.

13. The gaming system of claim 12, wherein the first data structure comprises independent sets of lookup tables for the first and second tiers; and wherein the operations further comprise dynamically modifying the lookup tables for multiple stages of the second tier independently from modifying the lookup tables for multiple stages of the first tier.

14. The gaming system of claim 1, wherein controlling the display system to sequentially display the multiple determined stage award values further comprises controlling the display system to display at least one stage award value for a different time interval than that for which another stage award value is displayed.

15. The gaming system of claim 1, wherein modifying the first data structure to limit selection of entries for the following stage to entries associated with award values at least equal to the determined first stage award value comprises modifying the first data structure to limit selection of entries for the following stage to entries associated with award values greater than the determined first stage award value.

16. A gaming system, comprising:
- a user interface system configured for receiving an indication to initiate one or more instances of an electronic game; and
- a control system comprising,
  - one or more processors, and
  - a memory storing one or more dynamic data structures, comprising a first data structure including at least a first lookup table having entries establishing probabilities and values of possible awards correlated with respective numerical values;
  - wherein the control system executes instructions which cause the control system to perform operations comprising:
    - determining a game instance outcome;
    - after determining the instance outcome, automatically determining whether a continuous symbol sequence feature will be awarded;
    - in response to determining that a continuous symbol sequence feature will be awarded, automatically determining award values for the continuous symbol sequence feature, comprising,
      - correlating a respective random number generator (RNG) call with a value of the first data structure to determine a first stage award value associated with the correlated value; and
      - in response to determining the first stage award value, modifying the first data structure to limit selection of entries for a following stage to entries associated with award values at least equal to the determined first stage award value; and
      - sequentially displaying multiple determined stage award values, wherein sequentially displaying the multiple determined stage award values comprises causing the control system to:
        - display the first stage award value for a first time interval at a first position on an animation object that is displayed on the user interface system;
        - animate the animation object to move in a first direction from the first position to a second position; and
        - display a following stage award value on the animation object for a second time interval at the second position.

17. The gaming system of claim 16, wherein the first data structure comprises a single lookup table, and wherein the operations further comprise, after determining a stage award value, masking entries in the lookup table associated with award values less than the determined stage award value.

18. The gaming system of claim 16, wherein the first data structure comprises multiple lookup tables and wherein the operations further comprise:
- after determining the first stage award value, accessing a further lookup table having only entries associated with award values at least as great the award value of the determined first stage award value.

19. One or more machine-readable devices storing instructions and data structures, wherein at least one of the data structures is a dynamic data structure, and wherein the instructions, when executed by one or more processors, cause performance of operations, comprising:
- in response to receiving a signal, initiating at least one instance of an electronic game and determining an instance outcome;
- after determining the instance outcome, automatically determining whether a continuous symbol sequence feature will be awarded;
  - in response to determining that a continuous symbol sequence feature will be awarded:
    - automatically determining award values for the continuous symbol sequence feature, comprising:
      - correlating a respective random number generator (RNG) call with a value of the dynamic data structure to determine a first stage award value for the continuous symbol sequence feature;
      - in response to determining the first stage award value for the continuous symbol sequence feature, modifying the dynamic data structure to limit selection of entries of the dynamic data structure for determining a subsequent stage award value; and
      - correlating a subsequent RNG call with a value of the modified dynamic data structure to determine a subsequent stage award value; and
    - causing sequential display of multiple determined stage award values, comprising:
      - causing display of the first stage award value for a first time interval at a first position on an animation object;
      - animating the animation object to move in a first direction from the first position to a second position; and
      - causing display of a subsequent stage award value on the animation object for a second time interval at the second position.

20. The one or more machine-readable devices of claim 19, wherein the dynamic data structure comprises at least one set of multiple lookup tables, and wherein modifying the dynamic data structure to limit selection of entries of the dynamic data structure for determining a subsequent stage award comprises determining one or more lookup tables from the set of lookup tables in response to the determined first stage award value.

* * * * *